United States Patent
Hongo et al.

(10) Patent No.: US 7,416,048 B2
(45) Date of Patent: Aug. 26, 2008

(54) PORTABLE TERMINAL APPARATUS

(75) Inventors: Manabu Hongo, Sapporo (JP); Yoshiaki Kato, Sapporo (JP); Nariyasu Hayakawa, Sapporo (JP); Toshikazu Ishioka, Sapporo (JP); Hiroaki Sakashita, Sapporo (JP); Yoshifumi Kajiwara, Sapporo (JP); Hidehiko Hizuka, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 138 days.

(21) Appl. No.: 10/986,016

(22) Filed: Nov. 12, 2004

(65) Prior Publication Data

US 2006/0037807 A1 Feb. 23, 2006

(30) Foreign Application Priority Data

Aug. 18, 2004 (JP) .............................. 2004-238540

(51) Int. Cl.
*H04M 1/02* (2006.01)
(52) U.S. Cl. ....................... 181/199; 181/148; 181/153; 381/349; 381/350
(58) Field of Classification Search ................. 181/199, 181/148, 153; 381/349, 350
See application file for complete search history.

(56) References Cited

U.S. PATENT DOCUMENTS

| 588,034 | A | * | 8/1897 | Thorne ....................... 181/199 |
| 4,299,304 | A | * | 11/1981 | Rebsch ....................... 181/144 |
| 4,977,975 | A | * | 12/1990 | Lazzeroni et al. ........... 181/129 |
| 4,979,586 | A | * | 12/1990 | Lazzeroni et al. ........... 181/129 |
| 5,721,401 | A | * | 2/1998 | Sim .............................. 181/148 |
| 5,790,679 | A | * | 8/1998 | Hawker et al. ............... 381/163 |
| 6,002,949 | A | * | 12/1999 | Hawker et al. ............. 455/569.1 |
| 6,064,894 | A | * | 5/2000 | Zurek et al. ............... 455/569.1 |
| 6,321,070 | B1 | * | 11/2001 | Clark et al. ............... 455/575.1 |
| 6,324,284 | B1 | * | 11/2001 | Hawker et al. ........ 379/433.02 |
| 6,359,984 | B1 | * | 3/2002 | Kim ....................... 379/433.02 |
| 6,621,910 | B1 | * | 9/2003 | Weckstrom et al. ......... 381/351 |
| 6,625,292 | B2 | * | 9/2003 | Proni .......................... 381/350 |
| 6,758,303 | B2 | * | 7/2004 | Zurek et al. ................. 181/155 |
| 6,834,744 | B2 | * | 12/2004 | Toki ........................... 181/148 |
| 6,876,743 | B2 | * | 4/2005 | Asahina et al. ........ 379/433.02 |
| 7,092,745 | B1 | * | 8/2006 | D'Souza ................. 455/575.1 |
| 7,103,393 | B2 | * | 9/2006 | Hwang .................... 455/569.1 |
| 7,110,536 | B2 | * | 9/2006 | Hampton et al. ....... 379/433.02 |

(Continued)

FOREIGN PATENT DOCUMENTS

JP 2002-345084 11/2002

OTHER PUBLICATIONS

Chinese Patent Office Action, mailed Nov. 30, 2007 and issued in Chinese Patent Application No. 200510063490.0.

*Primary Examiner*—Lincoln Donovan
*Assistant Examiner*—Forrest Phillips
(74) *Attorney, Agent, or Firm*—Staas & Halsey LLP

(57) ABSTRACT

A portable terminal apparatus with a telephone function such as a portable telephone, for efficiently emitting a voice from a speaker from both a front face and a backside of a housing. The portable terminal has: a first cover that includes a first sound outlet for emitting a sound from the speaker through the front of the portable terminal apparatus; a second cover that includes a second sound outlet for emitting a sound from the speaker through the back of the portable terminal apparatus; and a gasket accommodated at a position sandwiched between the first cover and the speaker.

10 Claims, 27 Drawing Sheets

U.S. PATENT DOCUMENTS

| | | | |
|---|---|---|---|
| 7,136,625 B2 * | 11/2006 | Ylitalo et al. | 455/90.3 |
| 7,142,686 B2 * | 11/2006 | Furuya et al. | 381/396 |
| 2002/0139608 A1 * | 10/2002 | Sugiyama et al. | 181/148 |
| 2002/0170772 A1 | 11/2002 | Asahina et al. | 181/153 |
| 2002/0187758 A1 * | 12/2002 | Ylitalo et al. | 455/90 |
| 2003/0194974 A1 * | 10/2003 | Curtis et al. | 455/90.1 |
| 2004/0081329 A1 * | 4/2004 | Huang et al. | 381/334 |
| 2005/0181841 A1 * | 8/2005 | Dou | 455/575.1 |
| 2005/0286717 A1 * | 12/2005 | Viduya et al. | 379/430 |
| 2006/0037807 A1 * | 2/2006 | Hongo et al. | 181/199 |
| 2006/0094484 A1 * | 5/2006 | Saito et al. | 455/575.7 |

* cited by examiner

PORTABLE TERMINAL APPARATUS

BACKGROUND OF THE INVENTION

1. Field of the Invention

The present invention relates to a portable terminal apparatus with a telephone function, such as a portable telephone.

2. Description of the Related Art

In recent years, portable terminal apparati such as portable telephones are remarkably developing, and it is demanded that they become further multifunctional, miniaturized and lightweight.

The portable telephone in recent years has a speaker built therein to hear a voice without putting one's ear on the portable telephone, and the speaker now has high performance to output music of sound quality. Japanese Patent Laid-Open No. 2002-345084 discloses an example of the speaker built into the portable telephone. The speaker disclosed in Japanese Patent Laid-Open No. 2002-345084 has a front face rim of its sound producing section surrounded by a circular gasket and a connector mounted on its backside, where assembly man-hours are reduced.

As a part of multifunctionality of a portable terminal apparatus such as a portable telephone, it is considered to provide openings for emitting a voice from a speaker on both the front face and backside of a housing of the portable telephone so that the voice from the speaker can be heard whether a folding type portable telephone is open or closed for instance.

Here, the speaker disclosed in Japanese Patent Laid-Open No. 2002-345084 is intended to emit the voice only to the front face side, and has a connector mounted on its backside so that its structure is not suited to emitting a voice from the backside.

To emit the voice from both the front face and backside, the speaker of an ordinary type having a lead connected thereto is adopted rather than the speaker of a special structure as disclosed in Japanese Patent Laid-Open No. 2002-345084, and the backside of the speaker is also used. As the speaker is constituted to produce a sound from the front face, the sound from the backside has a low sound pressure. Therefore, it is necessary to devise a method to emit the voice efficiently so that it can be heard at a sufficient volume from the backside. Here, the sound from the front face of the speaker and the sound from the backside of the speaker are mutually in opposite phases, and so they are mutually canceled to reduce the sound pressure consequently if a part of the sound from the front face of the speaker is emitted from the housing in concert with the sound from the backside of the speaker.

SUMMARY OF THE INVENTION

The present invention has been made in view of the above circumstances and provides a portable terminal apparatus having a structure capable of efficiently emitting the voice from the speaker from both the front face and backside of the housing.

The portable terminal apparatus according to the present invention is a portable terminal apparatus with a telephone function, including:

a speaker having a sound producing section and a connecting section to which a lead to convey a sound signal to the sound producing section is connected;

a plate-like assembly having a speaker accommodating section which has a front face of the speaker exposed and also has an opening formed and placed on a backside of the speaker with a space and connecting the space to outside;

a first cover having a first sound producing section which emits a voice from the speaker to the outside at a position opposed to the front face of the speaker and covering a face on a side of the assembly facing the front face of the speaker;

a second cover having a second sound producing section which emits the voice from the speaker to the outside at a position opposed to the opening and covering the face on the side of the assembly facing the backside of the speaker; and a gasket accommodated at a position sandwiched between the assembly and the first cover, surrounding a rim of the sound producing section of the speaker and covering the connecting section so as to prevent propagation of the voice between the space and the first sound producing section.

In the case of the structure for emitting the voice only to the front face of the speaker by adopting the ordinary type speaker having the lead connected thereto, a circular gasket surrounding the sound producing section of the speaker is placed so as not to have vibration of the speaker conveyed to parts around the speaker and housing parts and resonate to generate noise as in the case of Japanese Patent Laid-Open No. 2002-345084 for instance. The structure in which the sound producing section of the speaker does not directly contact the surrounding parts is thus adopted. If the opening for emitting the voice to the backside of the speaker of the housing is formed with the as-is structure, however, the voice of sufficient sound pressure cannot be obtained from the backside of the speaker of the housing.

According to the present invention, the connecting section of the speaker having the lead connected thereto, which is no problem in the case of the structure for emitting the sound only from the front face of the speaker, is also clogged up with the gasket. Thus, it prevents the voice on the front face of the speaker from going through the opening of the connecting section and extending to the backside of the speaker to mutually cancel the voice with that from the backside of the speaker and also prevents the sound on the backside from leaking into the housing. According to the present invention, it is possible, by clogging up the connecting section with the gasket, to efficiently emit the voice from the backside of the speaker from the second sound producing section as the voice of sufficient sound pressure.

Here, as for the portable terminal apparatus according to the present invention, it should desirably have the gasket accommodated at the position sandwiched between the assembly and the second cover and surrounding the rim of the opening so as to prevent a leak of the voice from the opening to a section other than the second sound producing section.

It is thus possible to prevent the voice on the backside of the speaker from leaking to a section other than the second sound producing section so as to emit the voice more efficiently from the second sound producing section.

The portable terminal apparatus according to the present invention may have a pair of housings mutually supported on an axis to be pivotable and mutually openable and closable, wherein one of the housings includes the speaker, the assembly, the first cover, the second cover and the gasket.

The present invention is suitable for such a folding type portable terminal apparatus.

As for the portable terminal apparatus according to the present invention, it is desirable that the first sound producing section have an opening formed on the first cover and a covering which covers the opening and passes the voice and the second sound producing section have an opening formed on the second cover and a covering which covers the opening and passes the voice.

It is possible, by placing such coverings, to emit the voice to the outside, prevent outside dust from coming in and also prevent an internal structure from being viewed from the outside.

As described above, according to the present invention, it is possible to emit the sound from the speaker with the sufficient sound pressure from both the front face and backside of the housing.

DETAILED DESCRIPTION OF THE EMBODIMENTS

Hereafter, embodiments of the present invention will be described.

FIGS. 1 to 4 are perspective views showing an appearance of a portable telephone which is an embodiment of the present invention.

Figure 1:
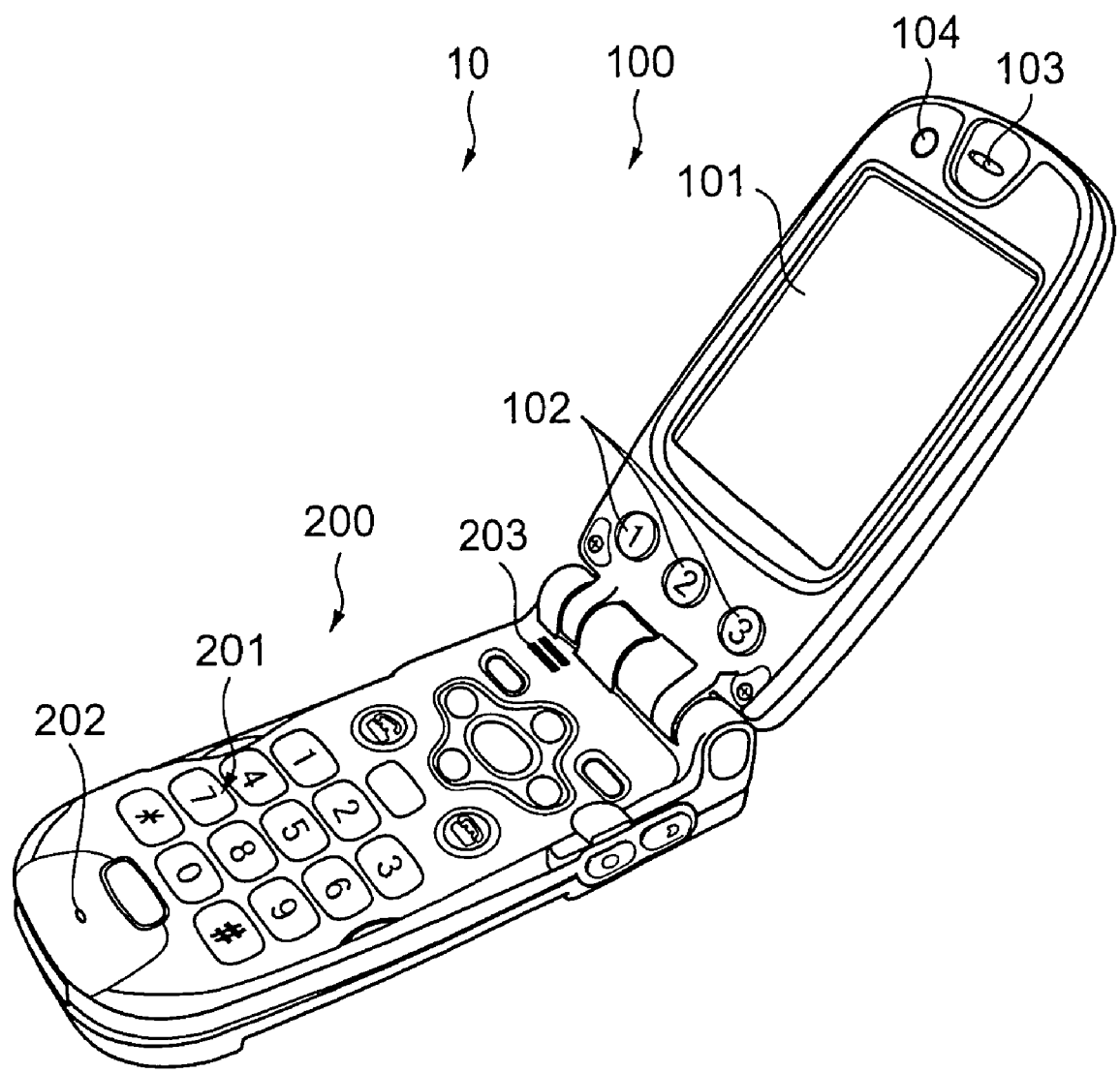
FIG. 1 is a perspective view showing an appearance of a portable telephone as an embodiment of a portable terminal apparatus according to the present invention.

The portable telephone shown here is a folding type. FIG. 1 is a perspective view showing an inside in an open state, FIG. 2 is a perspective view showing an outside in the open state, FIG. 3 is a perspective view showing an upside housing in a closed state, and FIG. 4 is a perspective view showing a downside housing in the closed state.

A portable telephone 10 includes an upside housing 100 and a downside housing 200 mutually supported on an axis to be pivotable.

As shown in FIG. 1, on an inner face of the upside housing 100, there is a large display window 101 for viewing a liquid crystal display screen placed therein extended in the middle. The display window 101 has three push buttons 102 arranged on its downside. On the upside of the display window 101, there are also an ear piece 103 for putting one's ear thereto to catch voice and a shooting window 104 for a digital camera facing the inside of the telephone 10 (the digital camera is called an "in-camera" here because it faces the inside).

Figure 2:
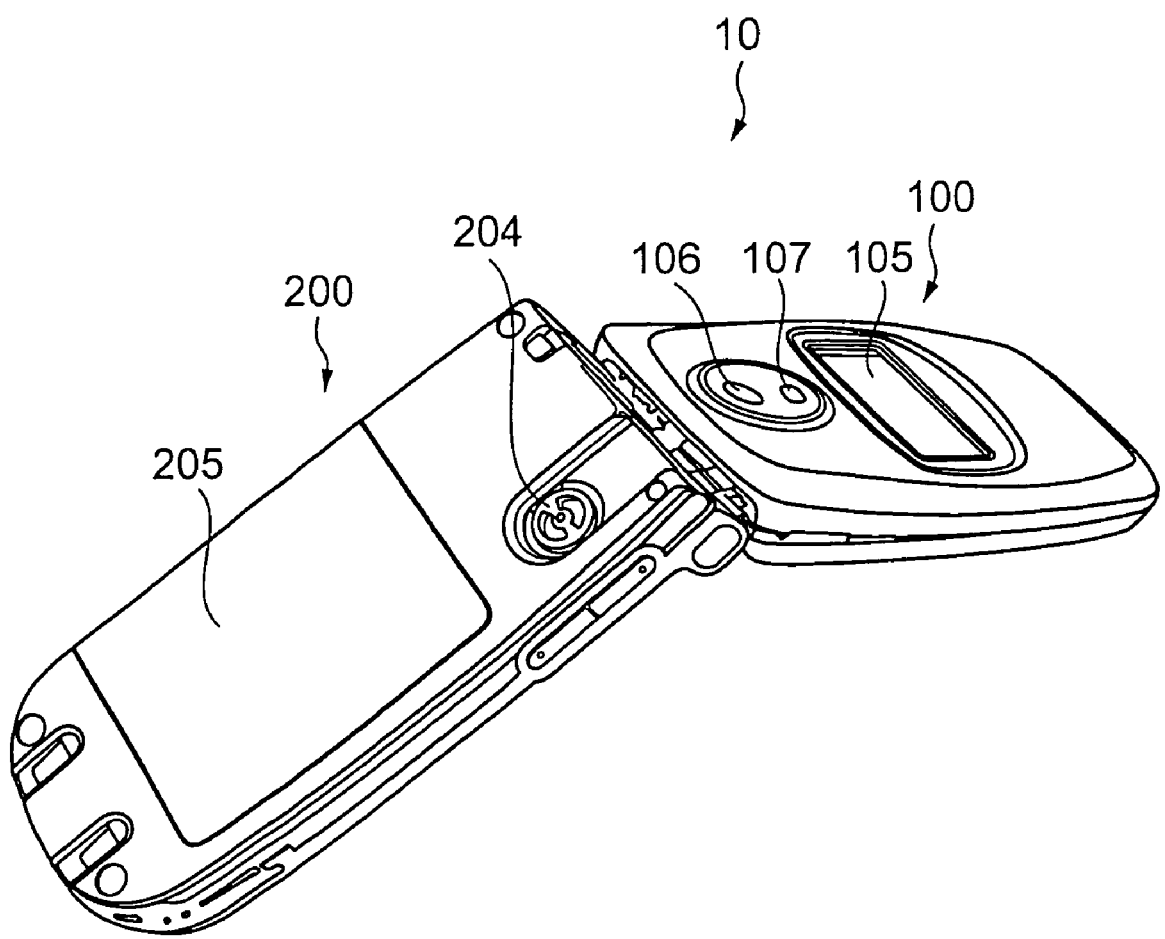
FIG. 2 is a perspective view showing the appearance of the portable telephone as an embodiment of the portable terminal apparatus according to the present invention.
Figure 3:
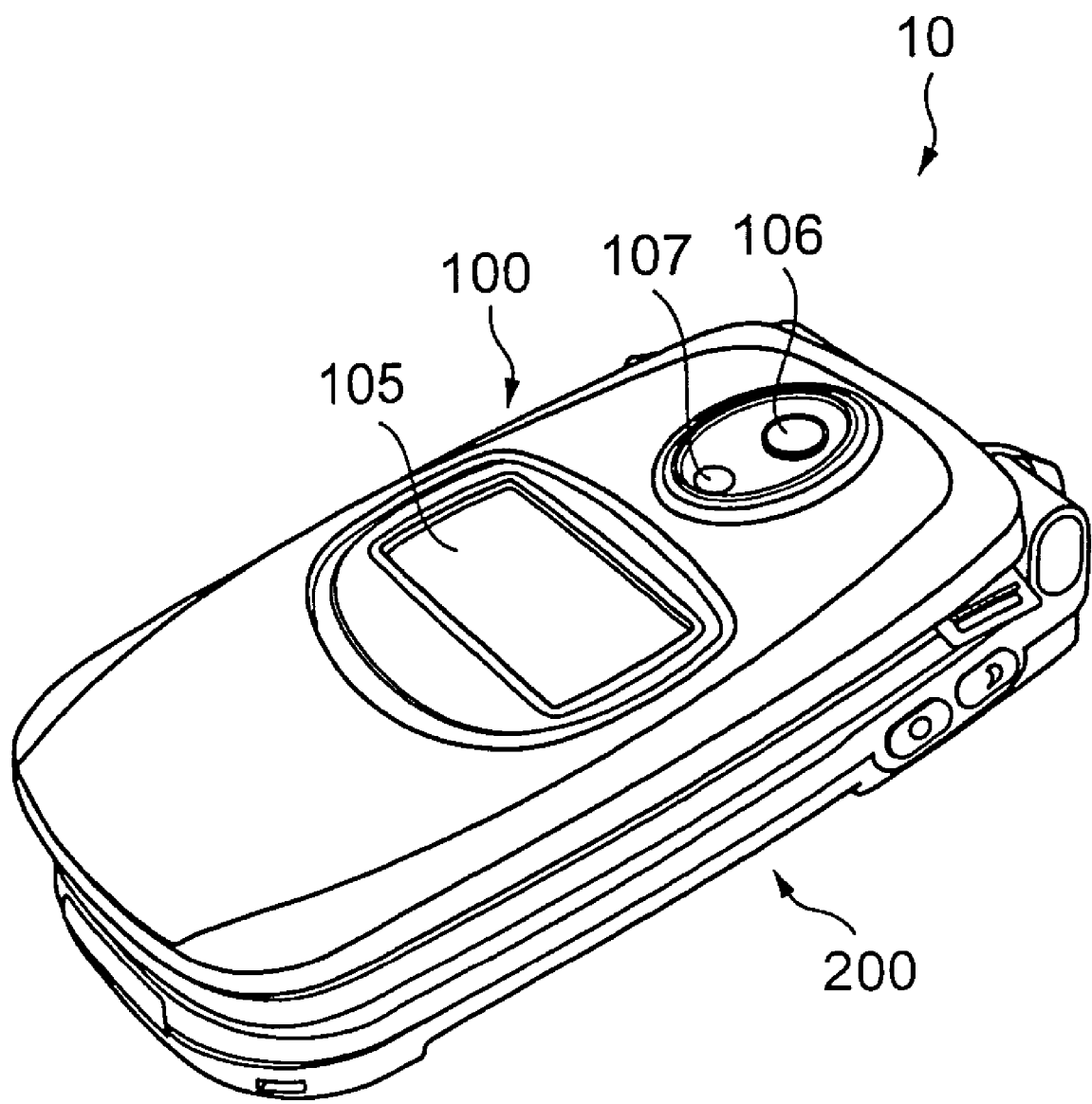
FIG. 3 is a perspective view showing the appearance of the portable telephone as an embodiment of the portable terminal apparatus according to the present invention.
Figure 4:
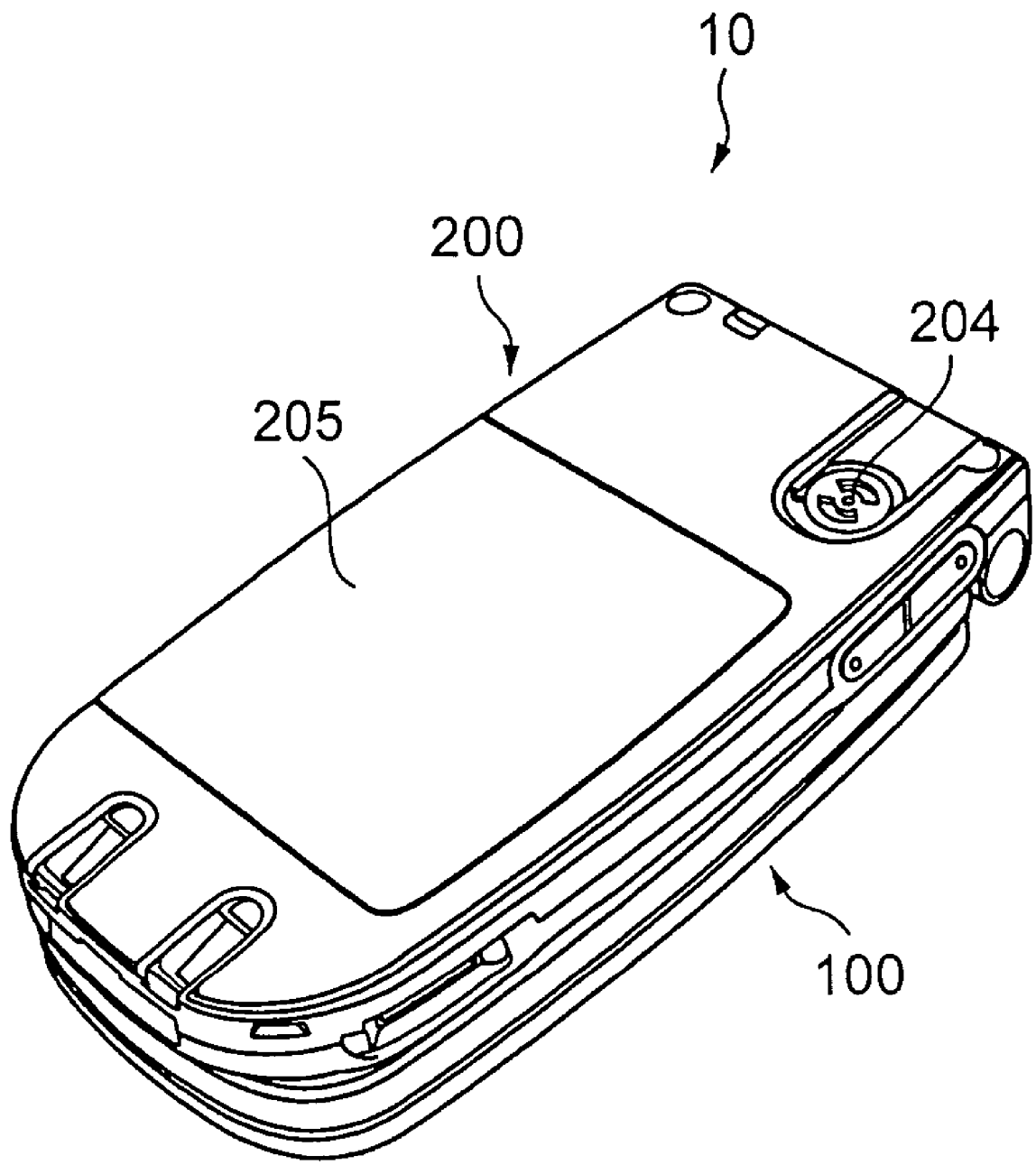
FIG. 4 is a perspective view showing the appearance of the portable telephone as an embodiment of the portable terminal apparatus according to the present invention.

As shown in FIGS. 2 and 3, the upside housing 100 has a display window 105 for viewing another liquid crystal display screen placed therein provided in the middle of an outer face thereof. On a hinge side linked to the downside housing 200 further from the display window 105, there are provided a shooting window 106 for another digital camera (the digital camera is called an "out-camera" here because it faces the outside), and a lighting section 107 for lighting up by having an LED inside it emit light to give notice of an incoming call and so on.

On an inner side face of the downside housing 200, there are a number of arranged push buttons 201 and a mouthpiece 202 having a microphone for receiving a user's voice and converting it to an electrical signal provided therein on the downside of the push buttons 201 as shown in FIG. 1. Furthermore, a sound outlet 203 for emitting the voice from a speaker provided inside is provided in the proximity of the hinge section of the downside housing 200 linked to the upside housing 100. As will be described later, the speaker provided at a depth of the sound outlet 203 faces the outside of the downside housing 200. Therefore, the sound outlet 203 is placed on a backside of the speaker.

As shown in FIGS. 2 and 4, the downside housing 200 has another sound outlet 204 for emitting the voice from the speaker front and a battery accommodating section 205 having a battery accommodated therein provided on the outer face thereof.

Figure 5:
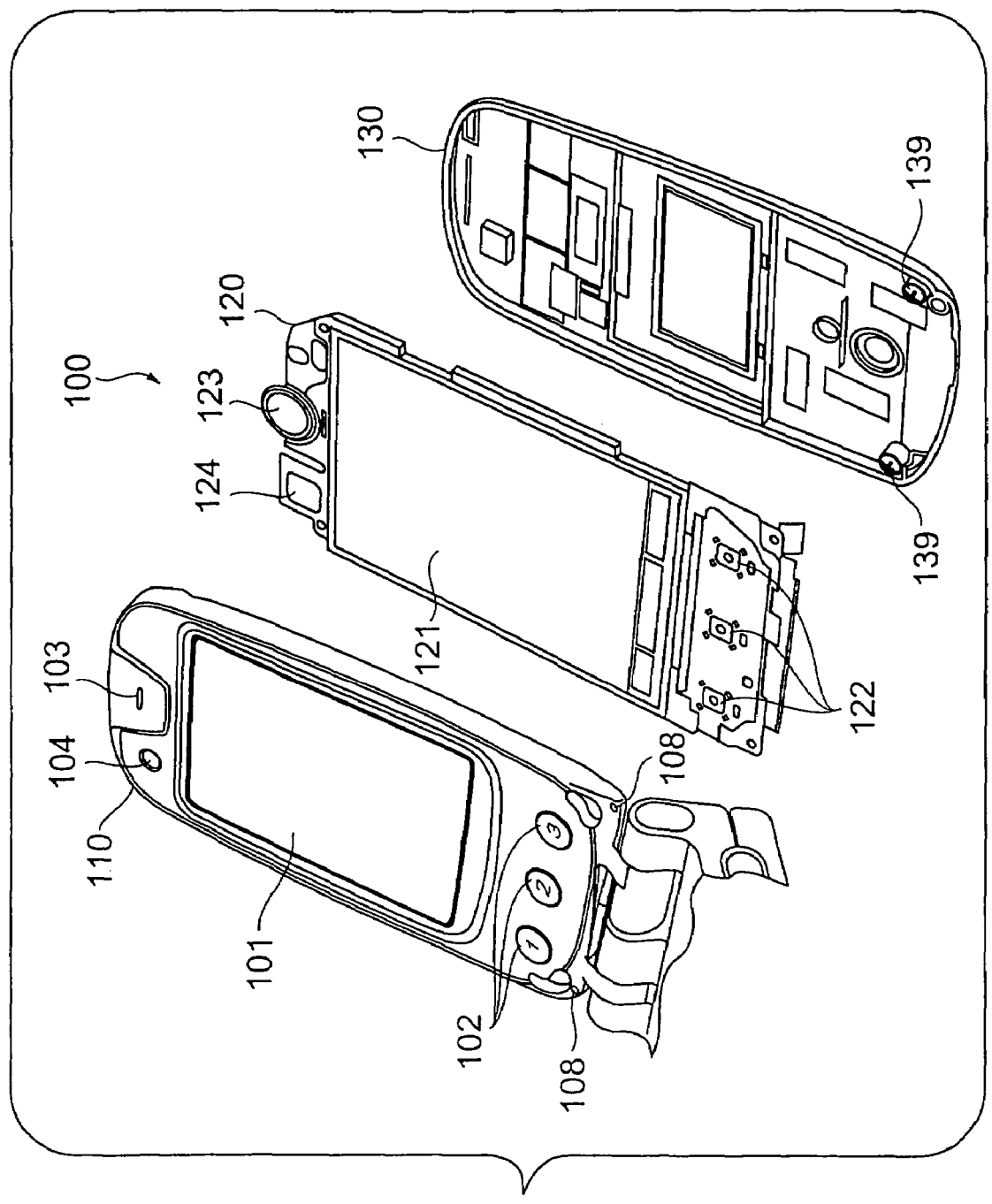
FIG. 5 is an exploded perspective view of an upside housing of the portable telephone shown in FIGS. 1 to 4.
Figure 6:
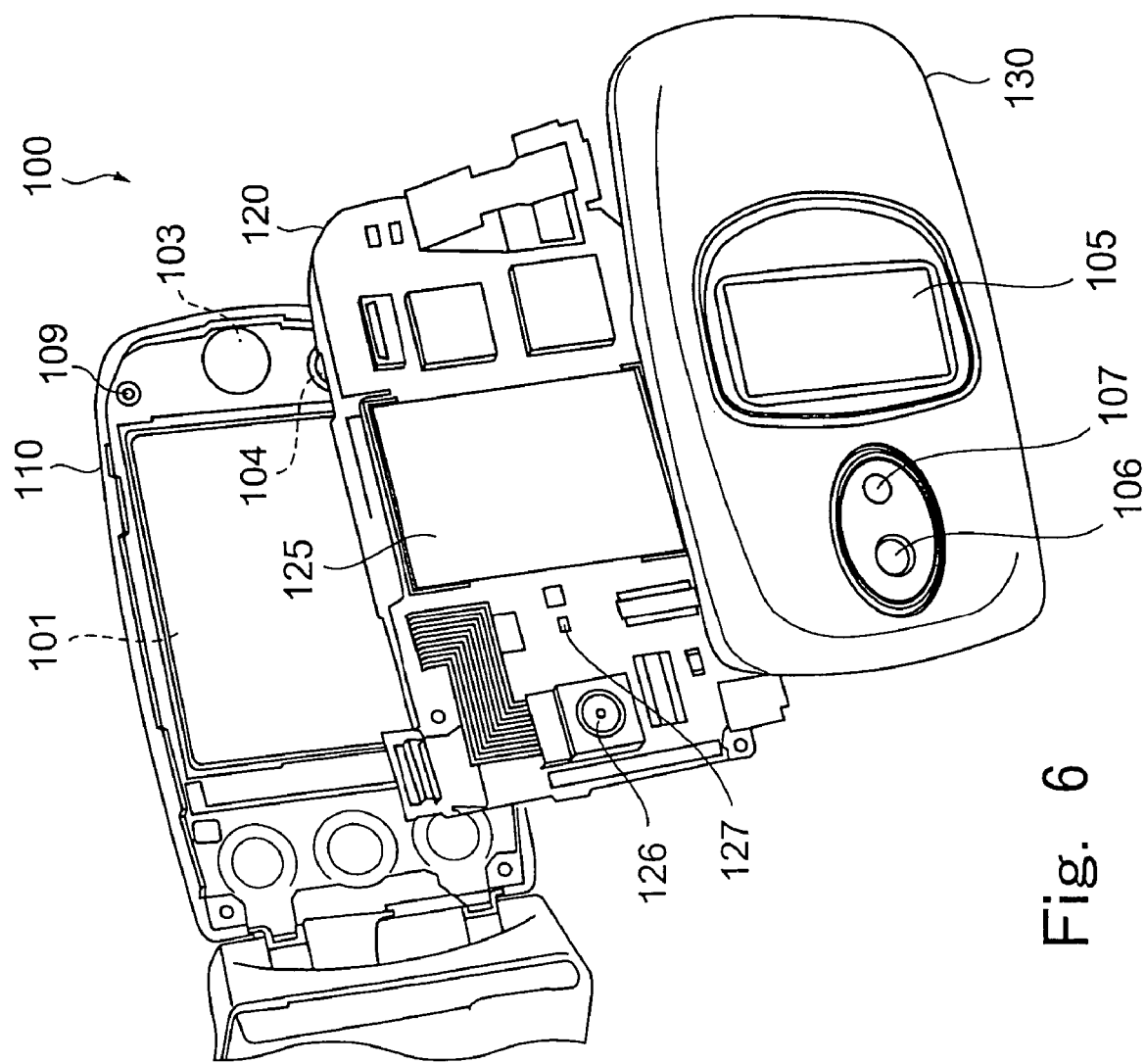
FIG. 6 is an exploded perspective view of the upside housing of the portable telephone shown in FIGS. 1 to 4.

FIGS. 5 and 6 are exploded perspective views of the upside housing of the portable telephone shown in FIGS. 1 to 4.

The upside housing 100 includes an inside cover 110, an assembly 120 and an outside cover 130, and has a structure for sandwiching the assembly 120 having a number of parts built therein between the inside cover 110 and outside cover 130.

As shown in FIG. 5, the assembly 120 has a liquid crystal display screen 121 provided at a position inside the display window 101 of the inside cover 110. And it has a receiver 123 for receiving a sound signal and producing a sound provided at a position equivalent to the inside of the ear piece 103 of the inside cover 110, and also has an in-camera 124 provided at a position equivalent to the inside of the shooting window 104 of the inside cover 110. Furthermore, the assembly 120 has contacts 122 for being turned on and off by pushing the push buttons 102, which are provided at positions equivalent to the insides of the three push buttons 102 provided on the inside cover 110.

As shown in FIG. 6, the assembly 120 also has a liquid crystal display screen 125, an out-camera 126 and an LED 127 that are provided at positions equivalent to the insides of the display window 105, shooting window 106 and lighting section 107 of the outside cover 130 respectively.

The assembly 120 has a number of electronic circuit modules and so on other than the parts provided therein.

Next, the structure of the assembly 120 of the upside housing 100 will be described by centering on a mounting structure of the out-camera 126.

Figure 7:
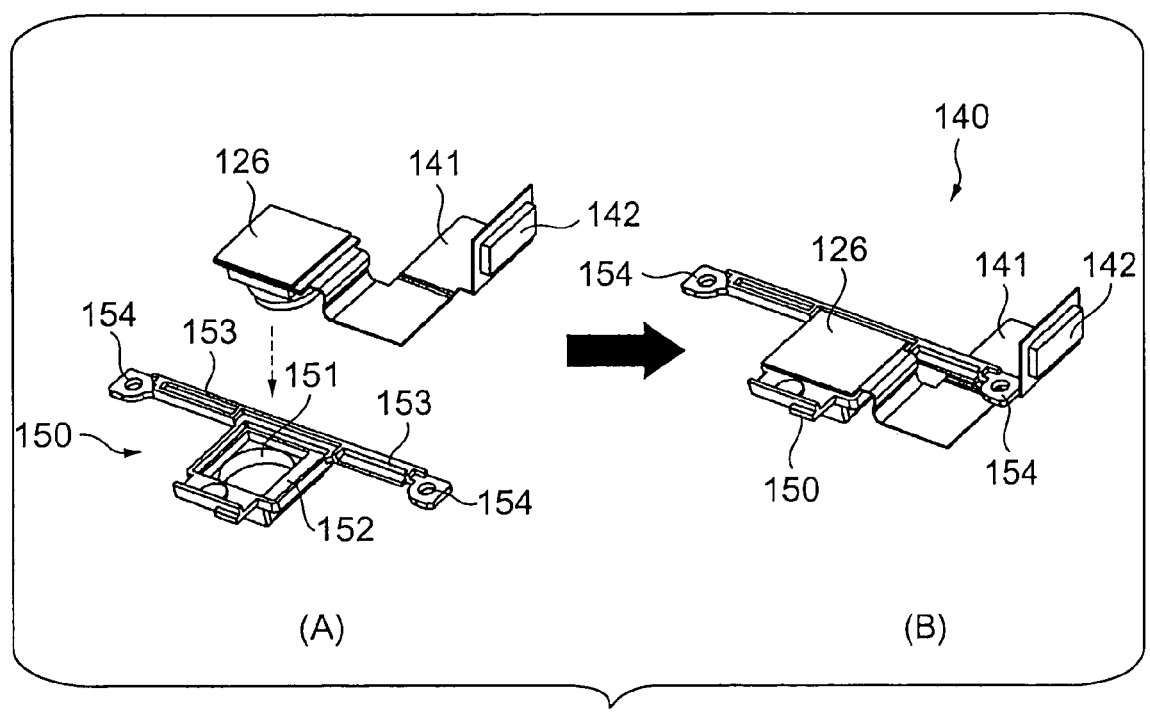
FIG. 7 is a perspective view showing an out-camera and an out-camera holder.

FIG. 7 is a perspective view showing the out-camera and an out-camera holder. Here, Part (A) of FIG. 7 is a perspective view separately showing the out-camera and out-camera holder, and Part (B) of FIG. 7 is a perspective view showing a state of accommodating the out-camera in the out-camera holder.

The out-camera 126 has a lens and an image pickup device that is not shown built therein. The out-camera 126 is connected to a flexible board 141 having wiring for conveying an image signal obtained by that image pickup device, and the flexible board 141 further has a connector 142 mounted thereon. The out-camera 126 faces downward in FIG. 7.

An out-camera holder 150 has an opening 151 for the out-camera 126 to look in provided in the middle thereof, and a wall section 152 is mounted surrounding the opening 151. As shown in Part (B) of FIG. 7, the out-camera 126 is accommodated in a portion surrounded by the wall section 152, and the wall section 152 supports the out-camera 126 by surrounding it. The out-camera holder 150 has two arm sections 153 extended on both sides, and mounting holes 154 are provided at ends of the two arm sections 153.

Figure 8:
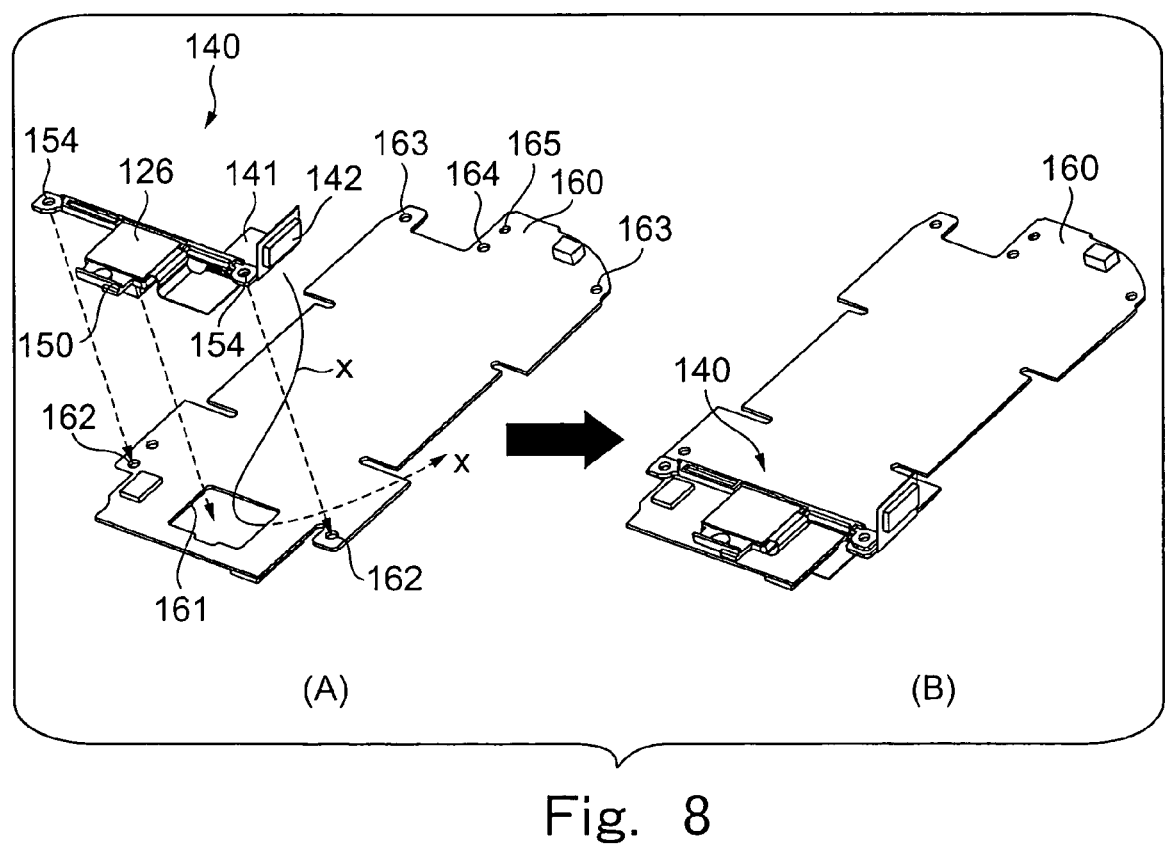
FIG. 8 is a perspective view showing a camera assembly consisting of an out-camera and an out-camera holder and a circuit board.

FIG. 8 is a perspective view showing a camera assembly including the out-camera and out-camera holder and a circuit board. Part (A) of FIG. 8 is a perspective view separately showing the camera assembly including the out-camera and out-camera holder and the circuit board. Part (B) of FIG. 8 is a perspective view showing a state of mounting the camera assembly on the circuit board.

A circuit board 160 has an opening 161 for placing the out-camera, mounting holes 162, 163 and 164 and a positioning hole 165 provided thereon.

Instead of the opening 161, the circuit board 160 may have a notch formed by extending the opening 161 to one side of the circuit board 160. However, a description will be continued here by assuming that the circuit board 160 has the opening 161 formed thereon.

Here, the mounting hole 162 is provided at a position to overlap the mounting hole 154 of the out-camera holder 150 when a camera assembly 140 is placed to have the out-camera 126 look out of the opening 161.

When placing the camera assembly 140 on the circuit board 160, the flexible board 141 goes down through the opening 161 and is placed through the backside of the circuit board 160 as shown by an arrow x in Part (A) of FIG. 8.

Figure 9:
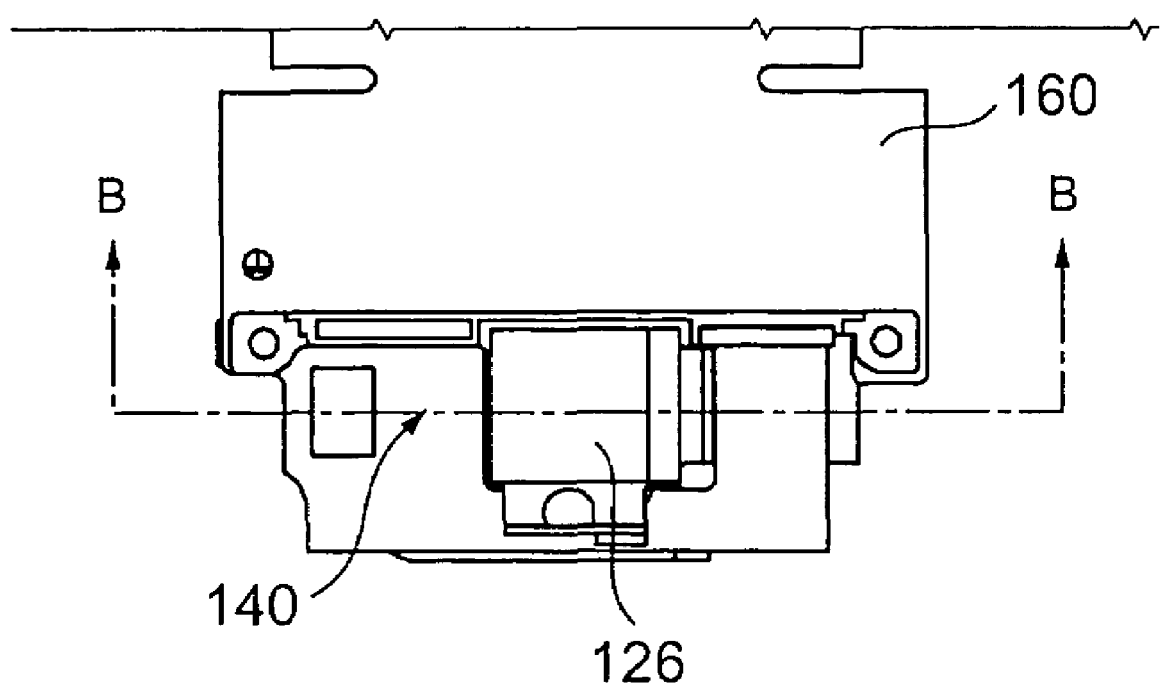
FIG. 9 is a plan view showing the camera assembly placed on the circuit board.
Figure 10:
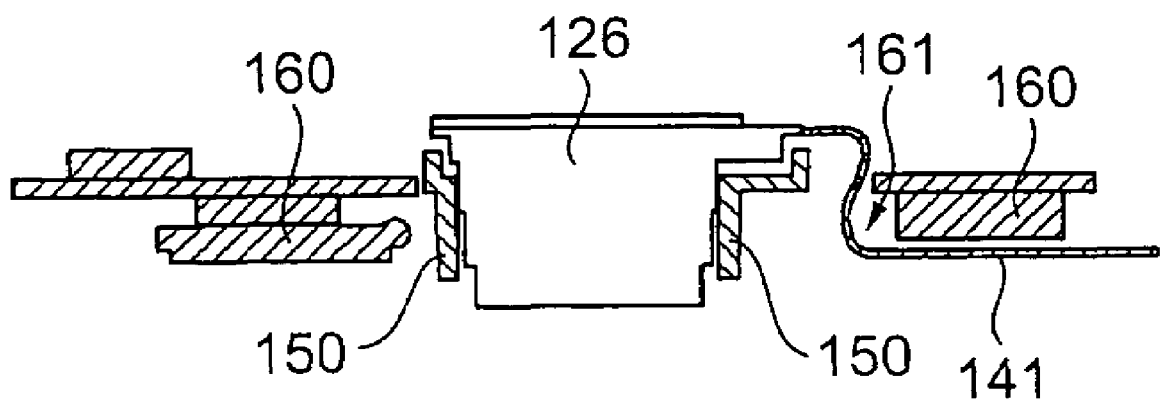
FIG. 10 is a sectional view along an arrow B to B shown in FIG. 9.

FIG. 9 is a plan view showing the camera assembly placed on the circuit board. FIG. 10 is a sectional view along an arrow B-B shown in FIG. 9.

FIG. 10 shows how the flexible board 141 extended from the out-camera 126 goes down through the opening 161 of the circuit board 160 and runs through the backside of the circuit board 160.

Figure 11:
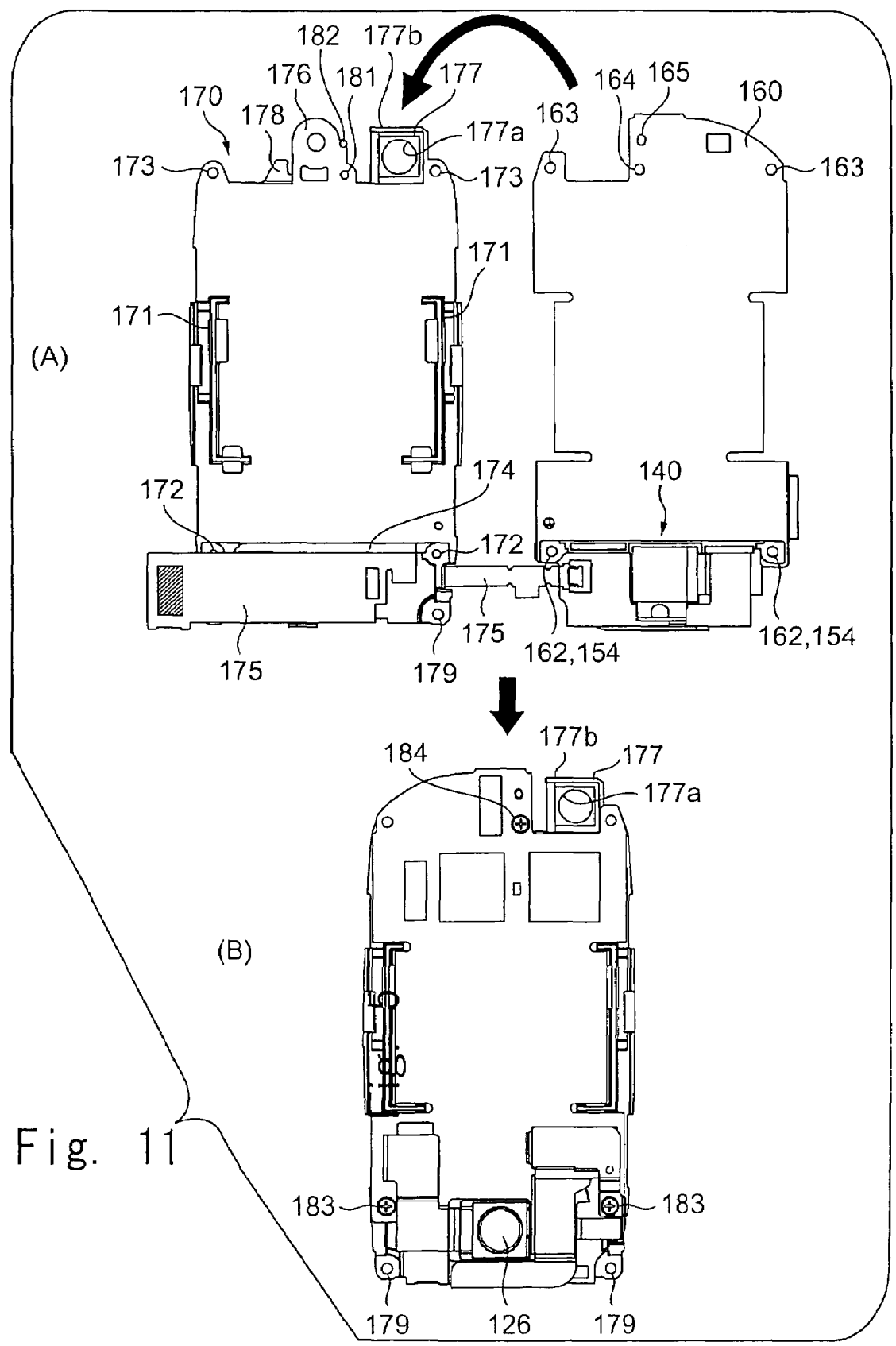
FIG. 11 is a diagram showing the circuit board having the camera assembly mounted thereon and a chassis on which the circuit board is to be fixed.

FIG. 11 is a diagram showing the circuit board having the camera assembly mounted thereon and the chassis on which the circuit board is to be fixed. Part (A) of FIG. 11 is a diagram separately showing the circuit board and chassis. Part (B) of FIG. 11 is a diagram showing the assembly having the circuit board mounted on the chassis.

Figure 12:
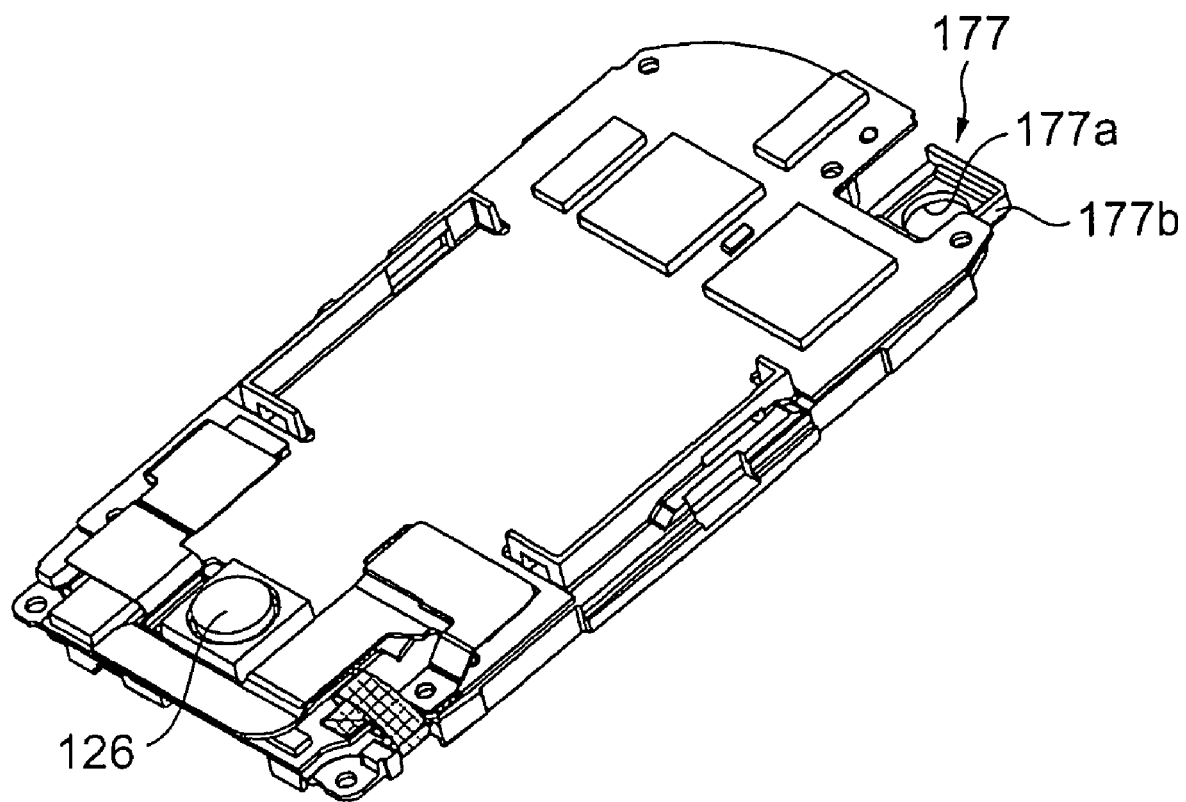
FIG. 12 is a perspective view of the assembly having the circuit board mounted on the chassis.

FIG. 12 is a perspective view of the assembly having the circuit board mounted on the chassis.

A chassis 170 is made by die-casting a magnesium alloy. The chassis 170 has walls 171 standing thereon and also has screw holes 172, mounting holes 173, a screw hole 181 and a positioning projection 182 provided thereon. The chassis 170 also has a long and thin slit 174 penetrating a front face and a rear face provided thereon.

As shown in FIG. 5, the chassis 170 has three contacts 122 provided on a rear face to the face shown in Part (A) of FIG. 11, and a flexible board 175 connected to the three contacts 122 goes through the slit 174 and is extended to the face of the chassis 170 shown in FIG. 11. The flexible board 175 is also extended to the circuit board 160 side without going through the slit 174.

Furthermore, the chassis 170 has a receiver fixing section 176 for fixing the receiver 123 (refer to FIG. 5), an in-camera placement section 177 for placing the in-camera 124 (refer to FIG. 5), and a canopy section 178 projecting from a body section of the chassis 170 described later provided thereon.

As shown by the arrow in Part (A) of FIG. 11, the circuit board 160 has the face on the side shown in Part (A) of FIG. 11 placed on the chassis 170 in a direction to contact the face on the side shown in Part (A) of FIG. 11. The two screw holes 172 provided on the chassis 170 are provided on positions overlapping the two mounting holes 162 provided on the circuit board 160 and the two mounting holes 154 provided on the out-camera holder 150. The mounting holes 173, screw hole 181 and positioning projection 182 provided on the chassis 170 correspond to the mounting holes 163,164 and positioning hole 165 provided on the circuit board 160 respectively. If the circuit board is placed on the chassis 170, the positioning projection 182 of the chassis 170 gets into the positioning hole 165 of the circuit board 160 so that the circuit board 160 is screwed on the chassis 170 with screws 183 and 184 shown in Part (B) of FIG. 11. In this case, the out-camera holder 150 and the circuit board 160 are screwed together on the chassis 170. The out-camera 126 set in the out-camera holder 150 has its backside supported by the chassis 170 via the flexible board 175. Thus, the out-camera 126 is supported by the out-camera holder 150 and also directly supported by the chassis 170 so as to be fixed as securely as directly fixing the out-camera 126 on the chassis 170. Here, it is also feasible to render the size of the mounting holes 154 of the out-camera holder 150 a little larger so as to fine-tune a mounting position and a posture (angle) of the out-camera 126.

After the circuit board 160 is placed on the chassis 170, the mounting holes 163 other than the mounting holes 162 and 164 of the circuit board 160 screwed on the chassis 170 and the mounting holes 173 out of the mounting holes 173 and 179 on the chassis 170 are screwed at a screw hole 109 (refer to FIG. 6) on the inside cover 110. And the mounting hole 179 on the chassis 170 is screwed at a screw hole 139 on the outside cover 130 with a screw inserted from a mounting hole 108 (refer to FIG. 5) on the inside cover 110.

FIGS. 11 and 12 do not show the receiver 123 and in-camera 124 (refer to FIG. 5). However, the receiver 123 is fixed on the receiver fixing section 176 of the chassis 170, and the in-camera 124 is placed on the in-camera placement section 177 of the chassis 170. The in-camera placement section 177 has an opening 177a for the in-camera to look in provided in the middle, and also has a wall 177b formed in surroundings thereof. And the in-camera 124 is placed in the in-camera placement section 177 of the chassis 170 so as to be directly and strongly held by the chassis 170.

Though it is not shown in FIGS. 11 and 12, the liquid crystal display screen (refer to FIG. 6) facing the outside cover 130 from the top of the circuit board 160 placed on the chassis 170 is placed in an area surrounded by the walls 171 of the chassis 170.

Thus, the circuit board 160 is placed on the chassis 170 and necessary parts are further mounted to constitute the assembly 120 shown in FIGS. 5 and 6.

The assembly 120 is assembled in a state of being sandwiched between the inside cover 110 and the outside cover 130 as previously described so as to constitute the upside housing 100 of the portable telephone.

Figure 13:
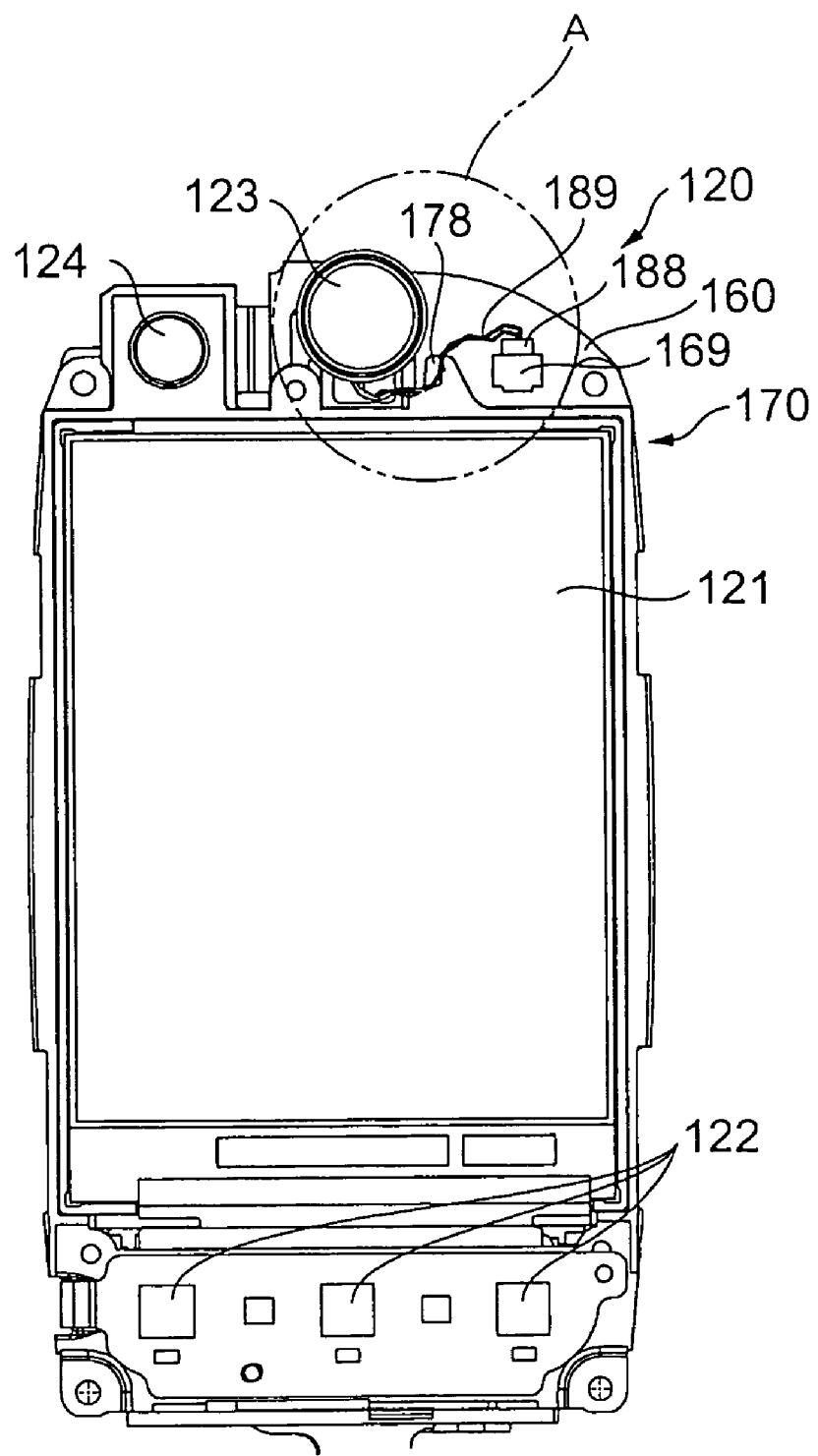
FIG. 13 is a plan view showing the face of the assembly shown in FIGS. 5 and 6 facing an inside cover side.
Figure 14:
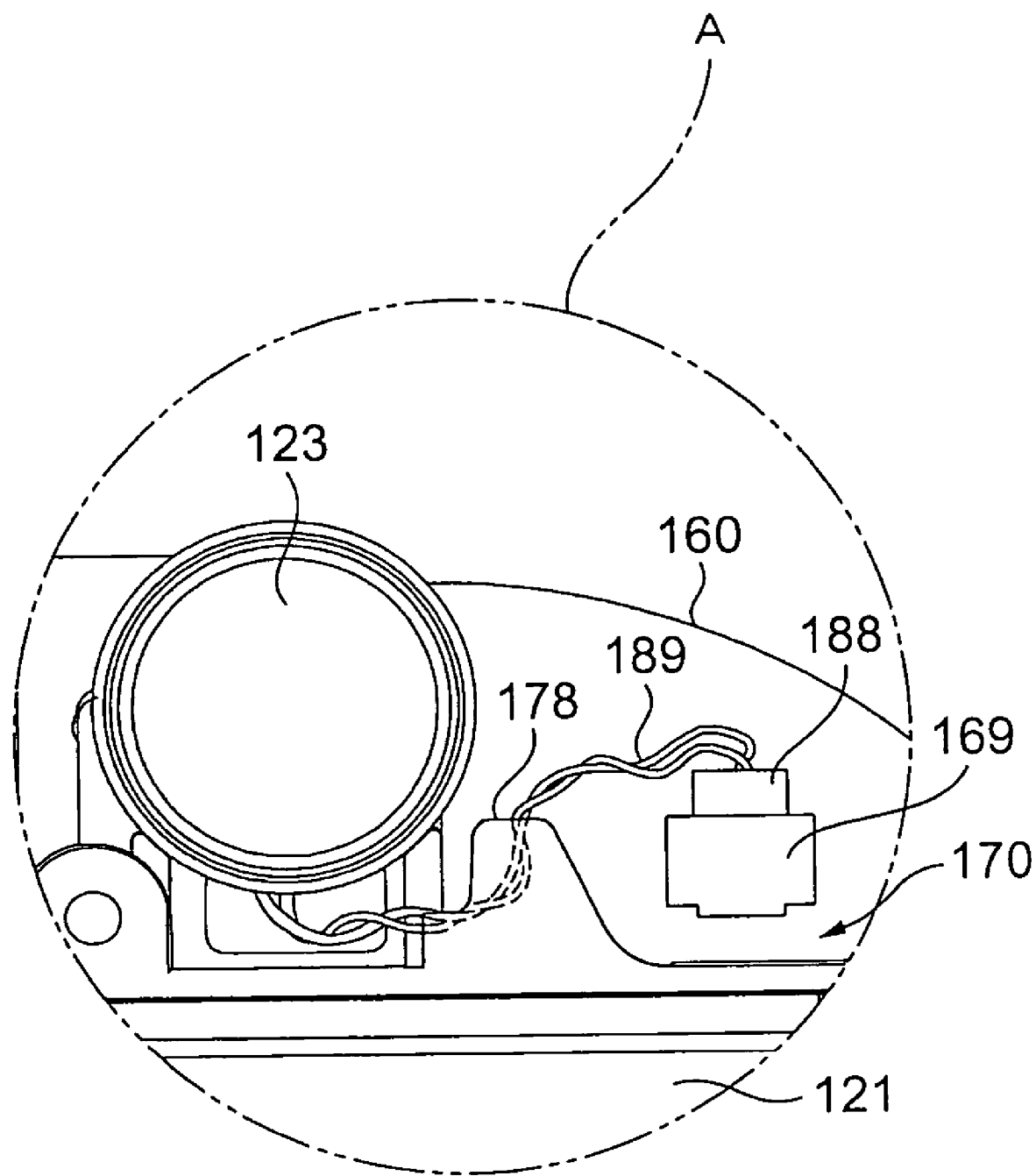
FIG. 14 is an enlarged plan view of the inside of a circle A shown in FIG. 3.

FIG. 13 is a plan view showing the face of the assembly 120 shown in FIGS. 5 and 6 facing the inside cover 110 side. FIG. 14 is an enlarged plan view of the inside of a circle A shown in FIG. 13.

FIG. 13 shows the liquid crystal display screen 121, three contacts 122, receiver 123, in-camera 124 and so on fixed on the chassis 170.

A lead 189 for conveying the sound signal to the receiver 123 is extended from the receiver 123, and a connector 188 is connected to the end of the lead 189. The connector 188 is connected to a connector 169 on the circuit board 160. Here, the lead 189 is reasonably long to facilitate assembly work for fitting the connector 188 at its end to the connector 169 on the circuit board 160. If the assembly work thereafter is performed with the lead 189 remaining as-is on the liquid crystal display screen 121, the assembly becomes incomplete. Thus, the projecting canopy section 178 for regulating a wiring position of the lead 189 is provided on the chassis 170 for fixing the receiver 123 so as to hold down the lead 189 with the canopy section 178. It is possible, by providing such a canopy section 178, to wire the lead 189 at a proper position not interfering with the assembly.

Next, a description will be given as to the structure of the downside housing 200 (refer to FIGS. 1 and 2) of the portable telephone 10 described here.

Figure 15:
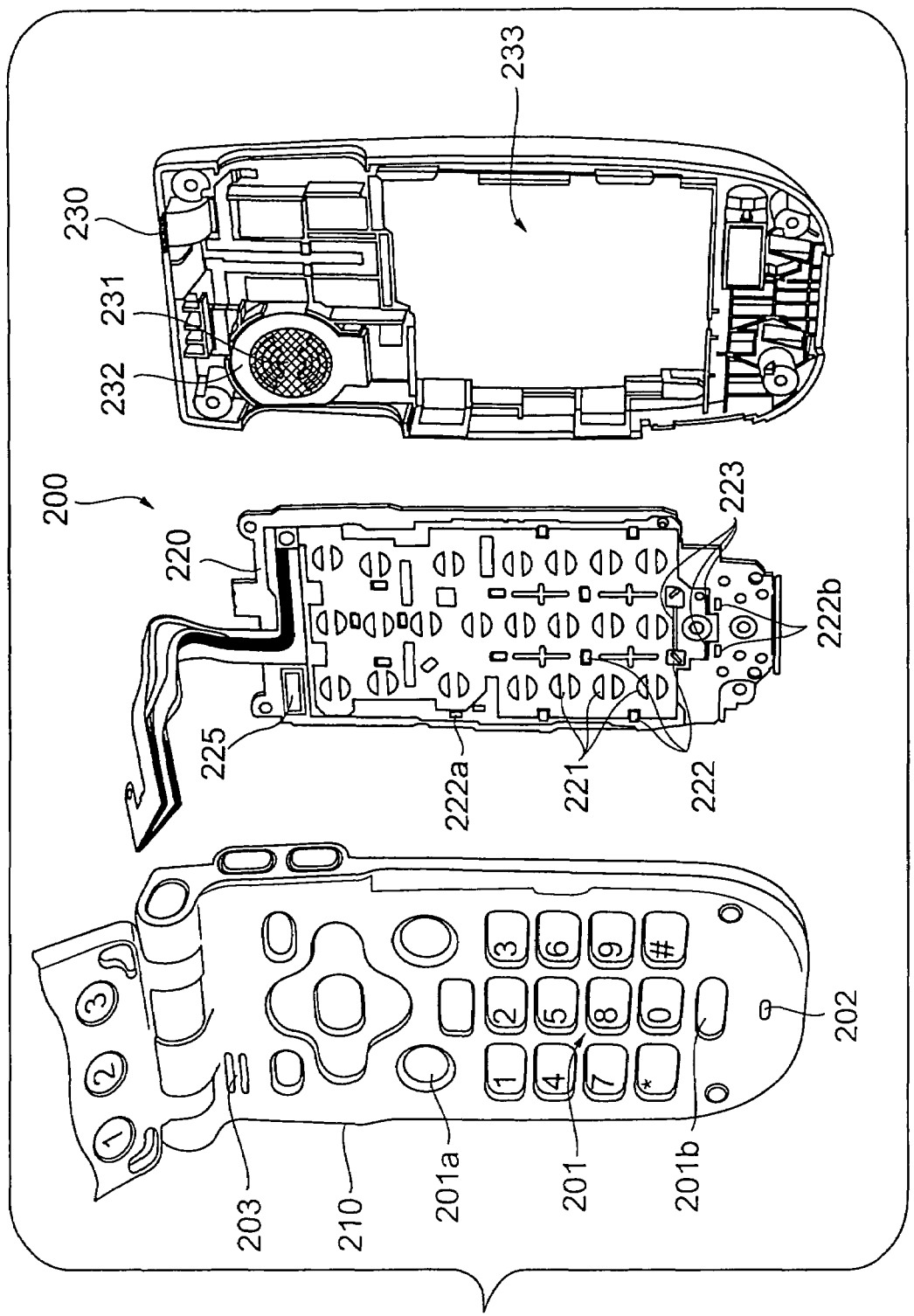
FIG. 15 is an exploded perspective view of the downside housing of the portable telephone shown in FIGS. 1 to 4.
Figure 16:
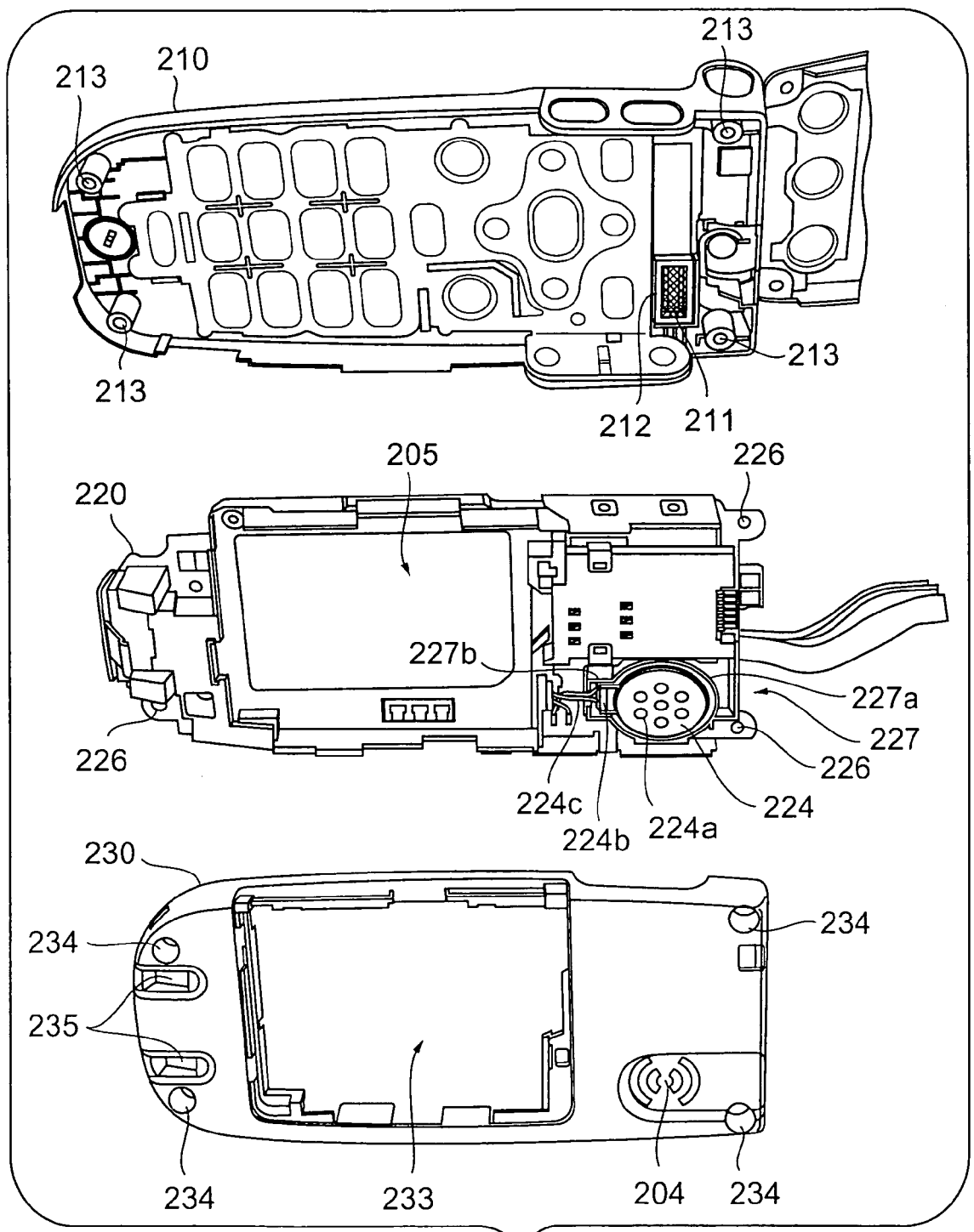
FIG. 16 is an exploded perspective view of the downside housing of the portable telephone shown in FIGS. 1 to 4.

FIGS. 15 and 16 are exploded perspective views of the downside housing of the portable telephone shown in FIGS. 1 to 4.

As with the upside housing 100 (refer to FIGS. 5 and 6) described so far, the downside housing 200 includes an inside cover 210, an assembly 220 and an outside cover 230, and has a structure for sandwiching the assembly 220 having a number of parts built therein with the inside cover 210 and outside cover 230.

The assembly 220 is plate-like as a whole, and contacts 221 to be turned on by pushing the push buttons are placed at positions corresponding to multiple push buttons 201 provided on the inside cover 210 respectively. And multiple LEDs 222 for lighting up the push buttons 201 are dispersedly placed. One LED 222a of the multiple LEDs 222 lights up a call button 201a out of the multiple push buttons 201, which is equivalent to picking up a receiver of a conventional telephone. Another LED 222b lights up a call button 201b out of the multiple push buttons 201. The multiple LEDs 222 which are dispersedly placed emit light all together and thereby light up the multiple push buttons 201 all together.

According to this embodiment, placement of the LEDs 222 is determined so that, on lighting up the multiple push buttons 201 all together, the multiple push buttons 201 including the call buttons 201a and 201b will light up all together without having the LEDs 222a and 222b for lighting up only the call buttons 201a and 201b emit light. And according to this embodiment, the LEDs 222 except the LEDs 222a and 222b emit light on lighting up the multiple push buttons 201 all together. However, it is also feasible, as the placement of the LEDs, to have the call buttons 201a and 201b lighted up by the LEDs 222a and 222b on lighting up the multiple push buttons 201 all together so as to have the LEDs 222 including the LEDs 222a and 222b emit light on lighting up the multiple push buttons 201 all together.

Here, the call button 201a as one of the two call buttons 201a and 201b is the push button to be pushed when making an ordinary call only with voice. The other call button 201b is the push button to be pushed when making a video-phone call accompanied by image communication. In FIG. 15, a light shielding member 223 is provided as if surrounding the portion corresponding to the call button 201b for video-phone of the assembly 220. This is intended to light up the call button 201b when the LED 222b emits light and prevent the other push buttons from lighting up due to the light leaked from the LED 222b. Details will be described later.

The assembly 220 has an opening 225 formed thereon for the sake of emitting the voice from the backside of the speaker (refer to FIG. 16) from the assembly 220. The voice emitted from the opening 225 is outputted to the outside of the portable telephone from the sound outlet 203 provided on the inside cover 210.

The outside cover 230 shown in FIG. 15 has an opening 233 for accommodating the battery formed thereon, and a mesh 231 is adhered to the inside of the sound outlet 204 (refer to FIGS. 2, 4 and 16) for emitting the voice from the front of the speaker (refer to FIG. 16) to the outside of the housing. The mesh 231 plays a role of emitting the voice from the speaker to the outside from the sound outlet 204 and preventing dust of the outside from entering into the housing.

A gasket 232 is adhered as if surrounding the sound outlet 204 (refer to FIGS. 2, 4 and 16) having the mesh 231 adhered thereto. The gasket 232 is intended to prevent a sound leak from around the speaker. Details of the gasket 232 will also be described later.

As shown in FIG. 16, on the inner face of the inside cover 210, there are a mesh 211 adhered to the inside of the sound outlet 203 (refer to FIGS. 1 and 15) and a gasket 212 adhered thereto by surrounding the mesh 211 provided. The gasket 212 clogs up the surroundings of the opening 225 of the assembly 220 shown in FIG. 15 to prevent the voice emitted from the opening 225 from leaking to any portion other than the sound outlet 203. The inside cover 210 also has screw holes 213 for screws.

As shown in FIG. 16, the assembly 220 has a speaker 224 mounted thereon with its front exposed, and also has a battery accommodating section 205 for accommodating the battery (not shown). Furthermore, the assembly 220 has mounting holes 226 provided thereon.

Here, the speaker 224 mounted on the assembly 220 has a sound producing section 224a which is almost circular and a connecting section 224b to which a lead 224c for conveying the sound signal to the sound producing section 224a is connected. And a speaker accommodating section 227 for accommodating the speaker 224 of the assembly 220 has a form matching with the form of the speaker 224, wherein a circular section 227a for accommodating the circular sound producing section 224a of the speaker 224 is connected to a rectangular section 227b for connecting the connecting section 224b of the speaker 224.

Furthermore, as shown in FIG. 16, the outside cover 230 has the sound outlet 204 and the opening 233 for accommodating the battery described so far provided thereon, and further has mounting holes 234 and battery charging electrodes 235 provided thereon. To assemble the inside cover 210, assembly 220 and outside cover 230, the assembly 220 is sandwiched between the inside cover 210 and outside cover 230, and screws are inserted into the mounting holes 234 of the outside cover 230 and mounting holes 226 of the assembly 220 from the mounting holes 234 side so as to be screwed in the screw holes 213 of the inside cover 210.

Figure 17:
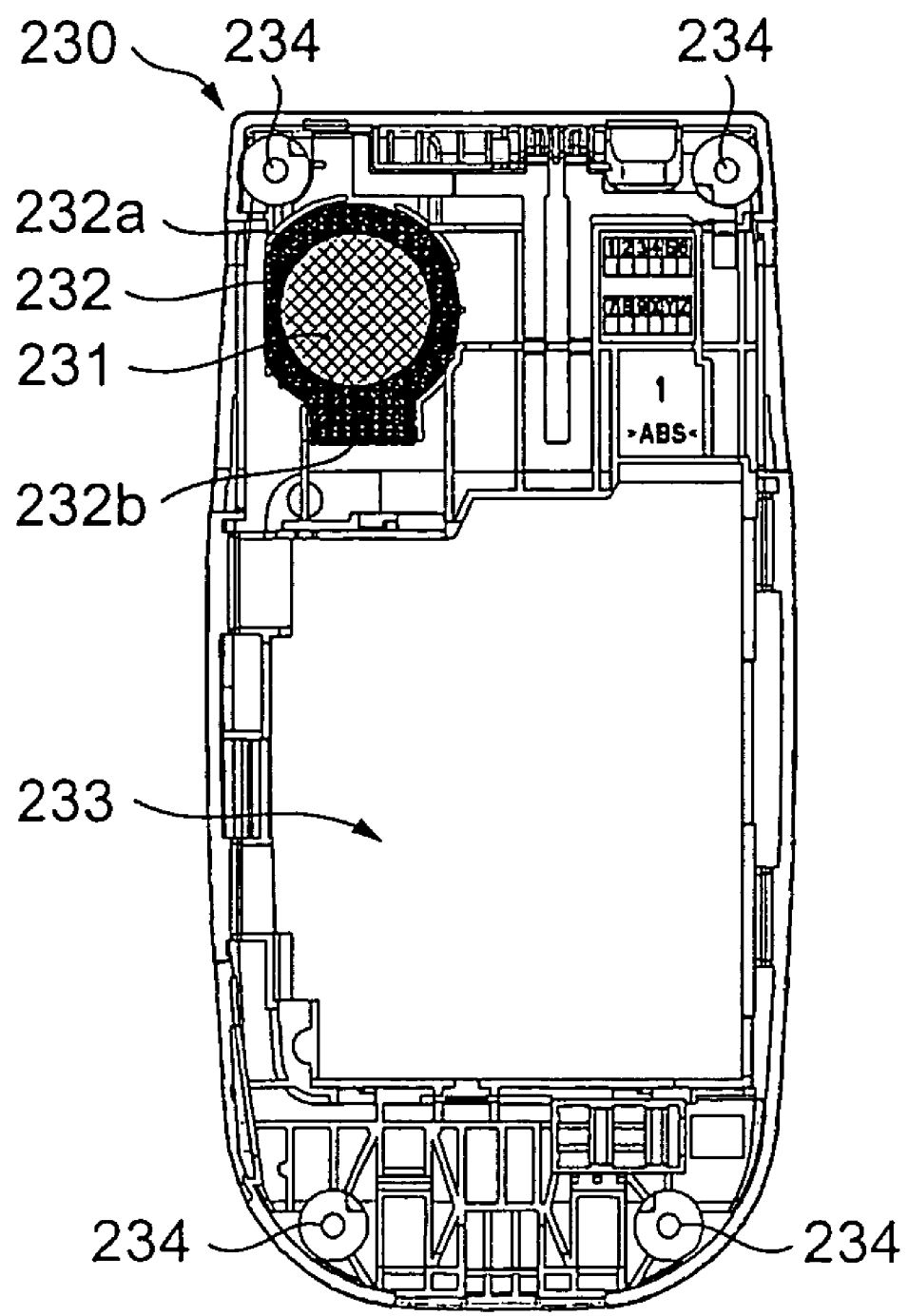
FIG. 17 is a plan view showing the inner face of an outside cover constituting the downside housing.

FIG. 17 is a plan view showing the inner face of the outside cover 230 (refer to FIGS. 5 and 6) constituting the downside housing 200 (refer to FIGS. 1 and 2).

Here, the mesh 231 is adhered to the portion to which the front face of the sound producing section 224a of the speaker 224 (refer to FIG. 16) is applied as previously described, and the gasket 232 is adhered to the surroundings of the mesh 231. The gasket 232 has a circular portion 232a and a rectangular portion 232b projecting from the circular portion. The circular portion 232a of the gasket 232 covers the surroundings of the sound producing section 224a (refer to FIG. 16) of the speaker 224, and is intended to prevent occurrence of unpleasant noise due to reduction in sound pressure and resonance caused by the voice emitted from the sound producing section 224a leaking to any portion other than the sound outlet 204 (refer to FIG. 16) having the mesh 231 adhered thereto.

The rectangular portion 232b of the gasket 232 plays a role of clogging up the rectangular section 227b having the connecting section 224b of the speaker 224 placed thereon of the speaker accommodating section 227 shown in FIG. 16 and acoustically separating a space formed on the backside of the speaker 224 (described later) from the front face of the sound producing section 224a in collaboration with the circular portion 232a. Details will be described later.

FIG. 17 shows the opening 233 for accommodating the battery and the mounting holes 234 for screws as previously described.

Figure 18:
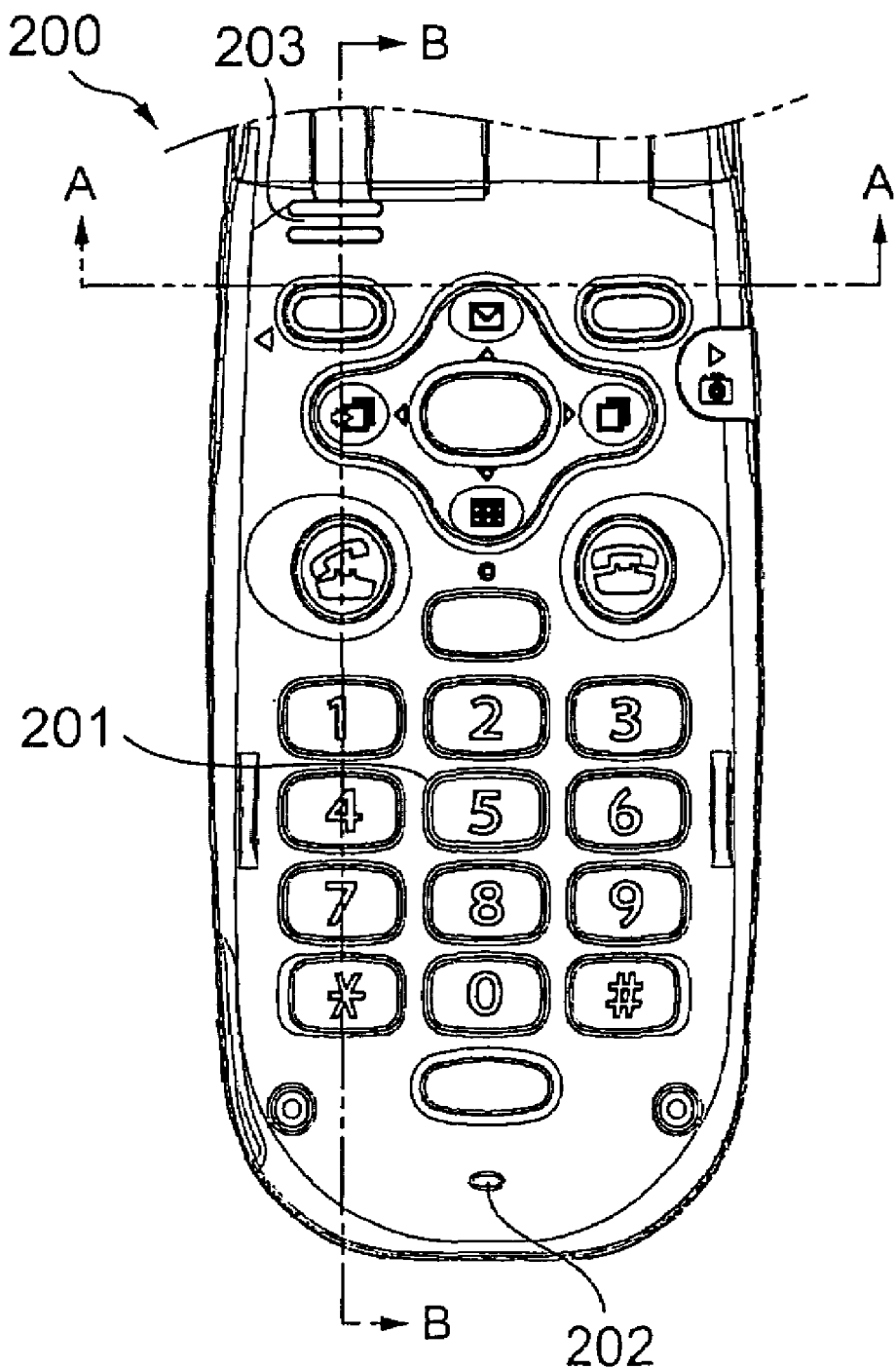
FIG. 18 is a plan view showing the downside housing.
Figure 19:
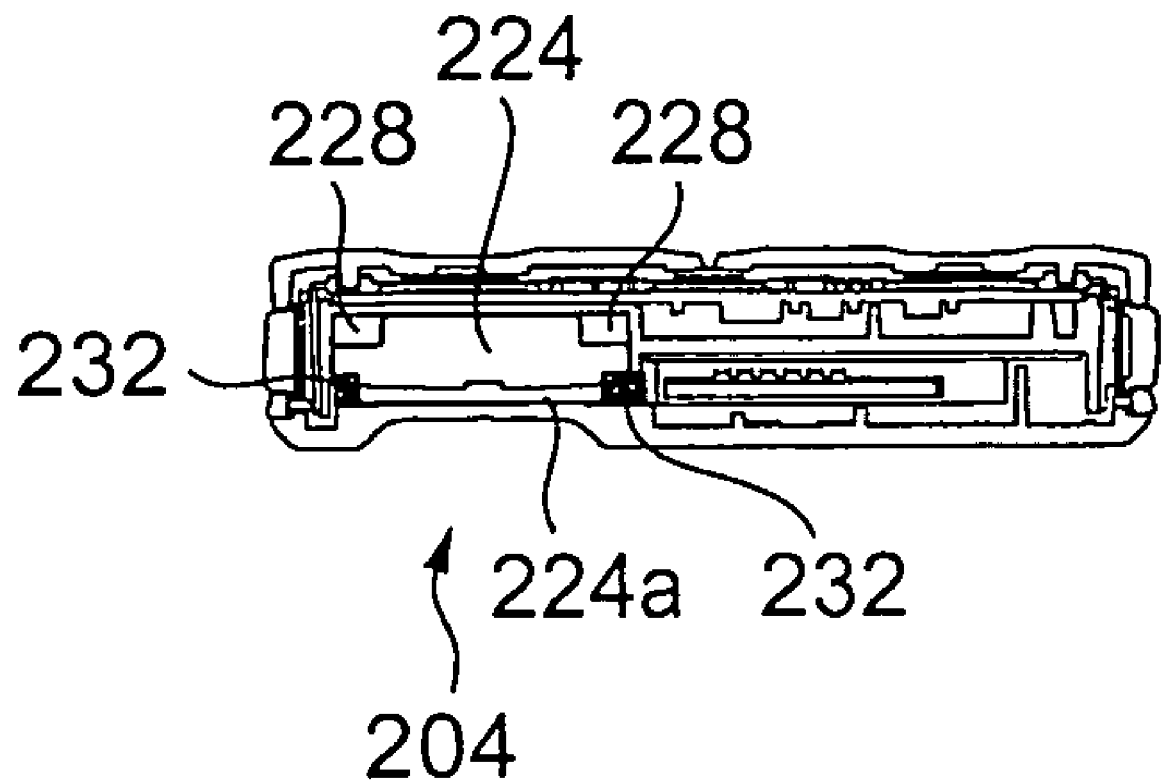
FIG. 19 is a sectional view along the arrow A to A shown in FIG. 18.
Figure 20:
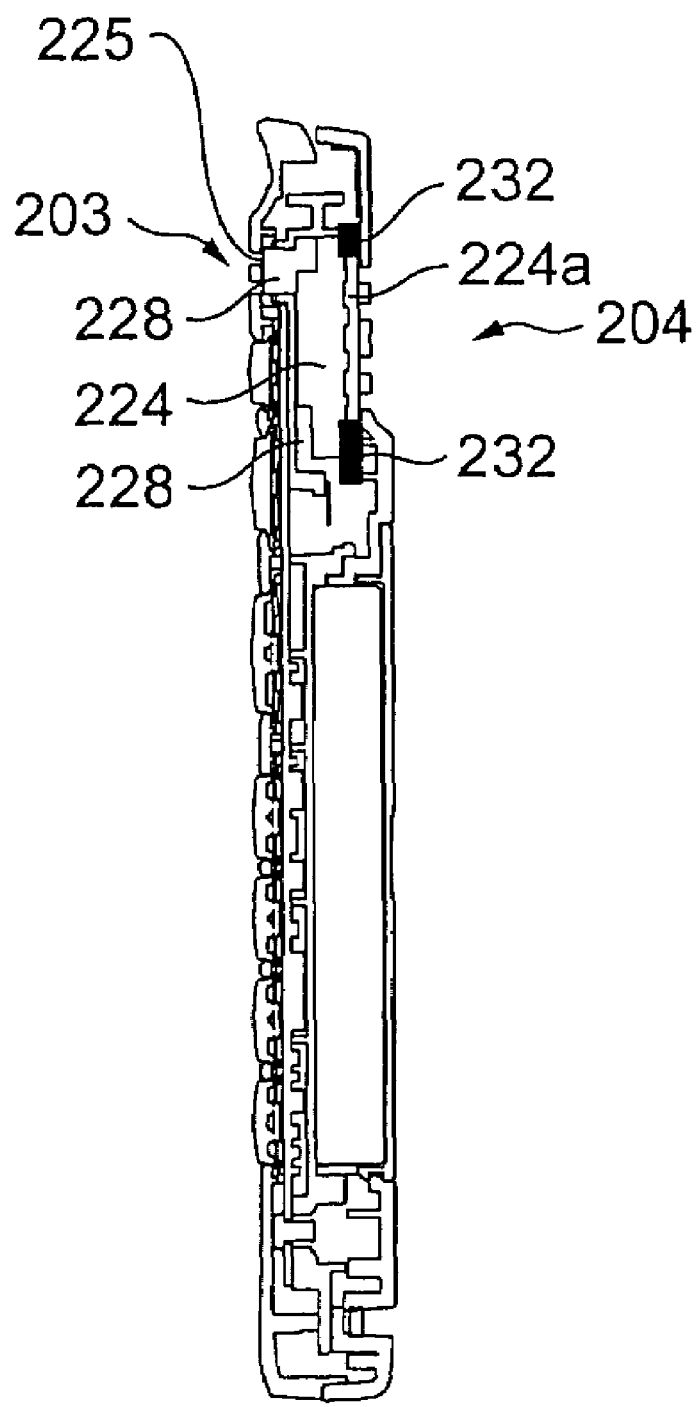
FIG. 20 is a sectional view along the arrow B to B shown in FIG. 18.

FIG. 18 is a plan view showing the downside housing. FIG. 19 is a sectional view along an arrow A to A shown in FIG. 18. FIG. 20 is a sectional view along an arrow B to B shown in FIG. 18.

FIG. 18 is a diagram for showing lines of sections in FIGS. 19 and 20, and a repeated description of the inner face of the downside housing will be omitted. The structure related to the sound outlet 203 will be described below.

As shown in FIGS. 19 and 20, the sound producing section 224a of the speaker 224 is facing the sound outlet 204 side, and the gasket 232 including the circular portion 232a and rectangular portion 232b shown in FIG. 17 is sandwiched between the sound outlet 204 and the speaker 224. And some spaces 228 are formed on the backside of the speaker 224 and lead to the opening 225 (refer to FIG. 15) of the assembly 220, where the opening 225 leads to another sound outlet 203. Here, the gasket 232 is intended to prevent the reduction in sound pressure of the voice emitted from the sound outlet 204 and occurrence of the unpleasant noise due to the sound emitted from the sound producing section 224a of the speaker 224 leaking to the surroundings. The gasket 232 plays another role, that is, the role of preventing the sound emitted from the sound producing section 224a of the speaker 224 from extending to the spaces 228 on the backside of the speaker 224.

In the case of a structure for emitting the sound from the speaker 224 only to the front face of the sound producing section 224a, there is no problem even if the sound extends to the spaces 228. In this case, it is sufficient only if the gasket 232 exists in the circular portion 232a surrounding the sound producing section 224a of the speaker 224. As opposed to this, in the case of the structure shown here, the sound emitted forward from the sound producing section 224a of the speaker 224 is emitted from the sound outlet 204, and the sound emitted on the backside of the speaker 224 is emitted from another sound outlet 203 via the spaces 228. Here, the voice emitted forward from the sound producing section 224a of the speaker 224 and the voice emitted from the backside of the speaker 224 to the spaces 228 are mutually in opposite phases, and so they are mutually canceled if the voice emitted from the sound producing section 224a extends to the spaces 228. The sound pressure of the voice emitted from the backside of the speaker 224 into the spaces 228 is not so high from the beginning. Therefore, if this voice is further canceled, only the voice of insufficient sound pressure can be obtained consequently from the sound outlet 203. Here, not only the circular portion 232a but also the rectangular portion 232b is provided to the gasket 232, and the voice emitted from the sound producing section 224a of the speaker 224 is thereby prevented from extending to the spaces 228 on the backside of the speaker 224 so as to emit the voice of sufficient sound pressure also from the sound outlet 203 on the backside of the speaker 224.

Figure 21:
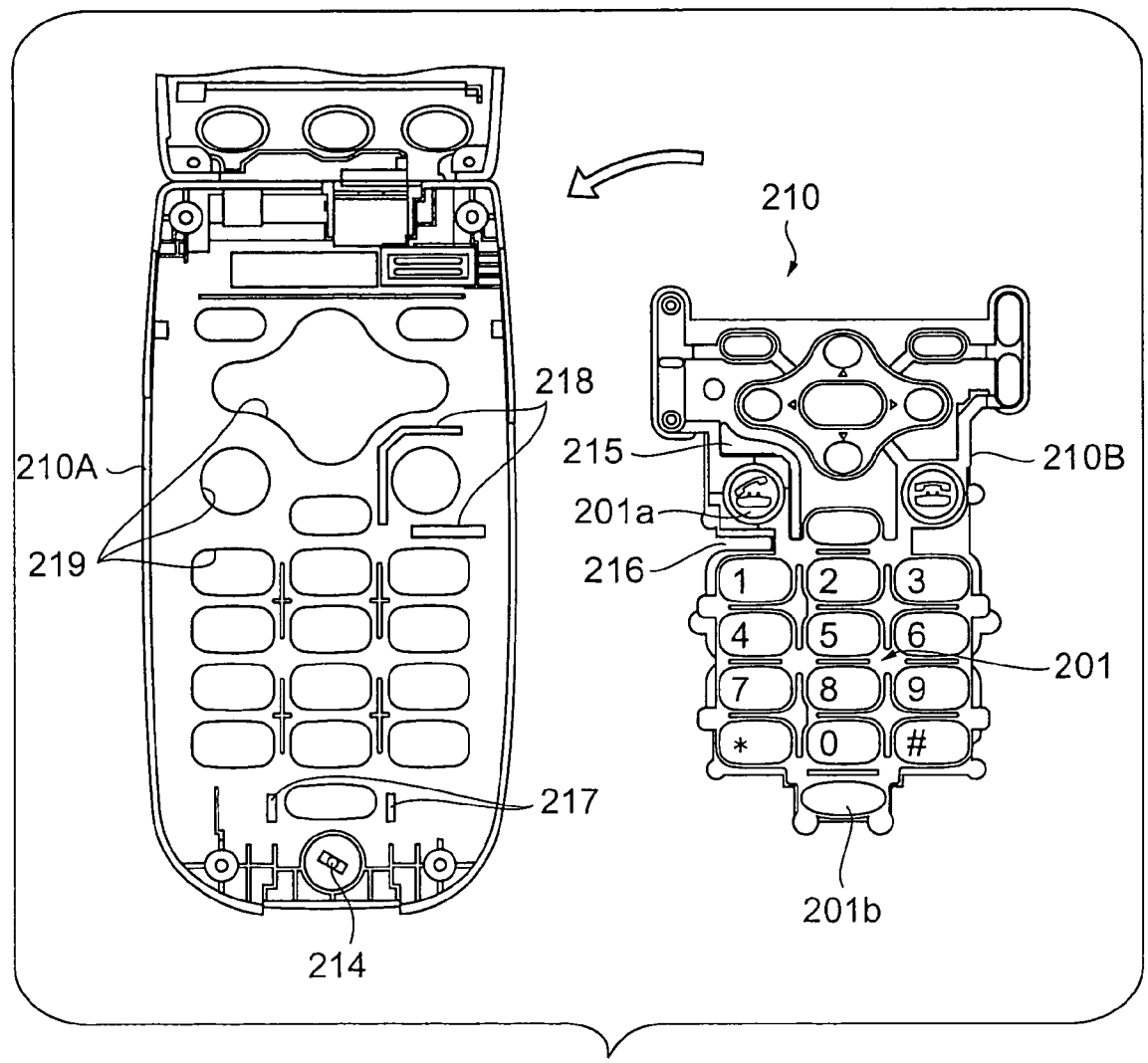
FIG. 21 is a further exploded view showing the inside cover constituting the downside housing.

FIG. 21 is a further exploded view showing the inside cover 210 (refer to FIGS. 5 and 6) constituting the downside housing 200 (refer to FIGS. 1 and 2).

The inside cover 210 includes a frame 210A having holes 219 provided to the portions equivalent to the push buttons and a push button sheet 210B having the push buttons made of a hard material of which locations corresponding to the holes 219 are formed like projections with the push buttons linked by a flexible sheet. The flexible sheet is made of a half-transparent material, and a material for dispersedly transmitting light is used for the push buttons. As shown by the arrow in FIG. 21, the push button sheet 210B has the face shown in FIG. 21 placed on the frame 210A in a direction of the frame 210A contacting the face shown in FIG. 21, and the push buttons 201 of the push button sheet 210B are fitted in the holes 219 of the frame 210A.

The frame 210A has a small microphone 214 provided at a position on the backside of the mouthpiece 202 shown in FIG. 1.

The frame 210A has light shielding walls 217 and 218 adhered to the inner face thereof.

The push button sheet 210B has a long hole 215 and a slit 216 formed at the locations corresponding to the light shielding wall 218.

Figure 22:
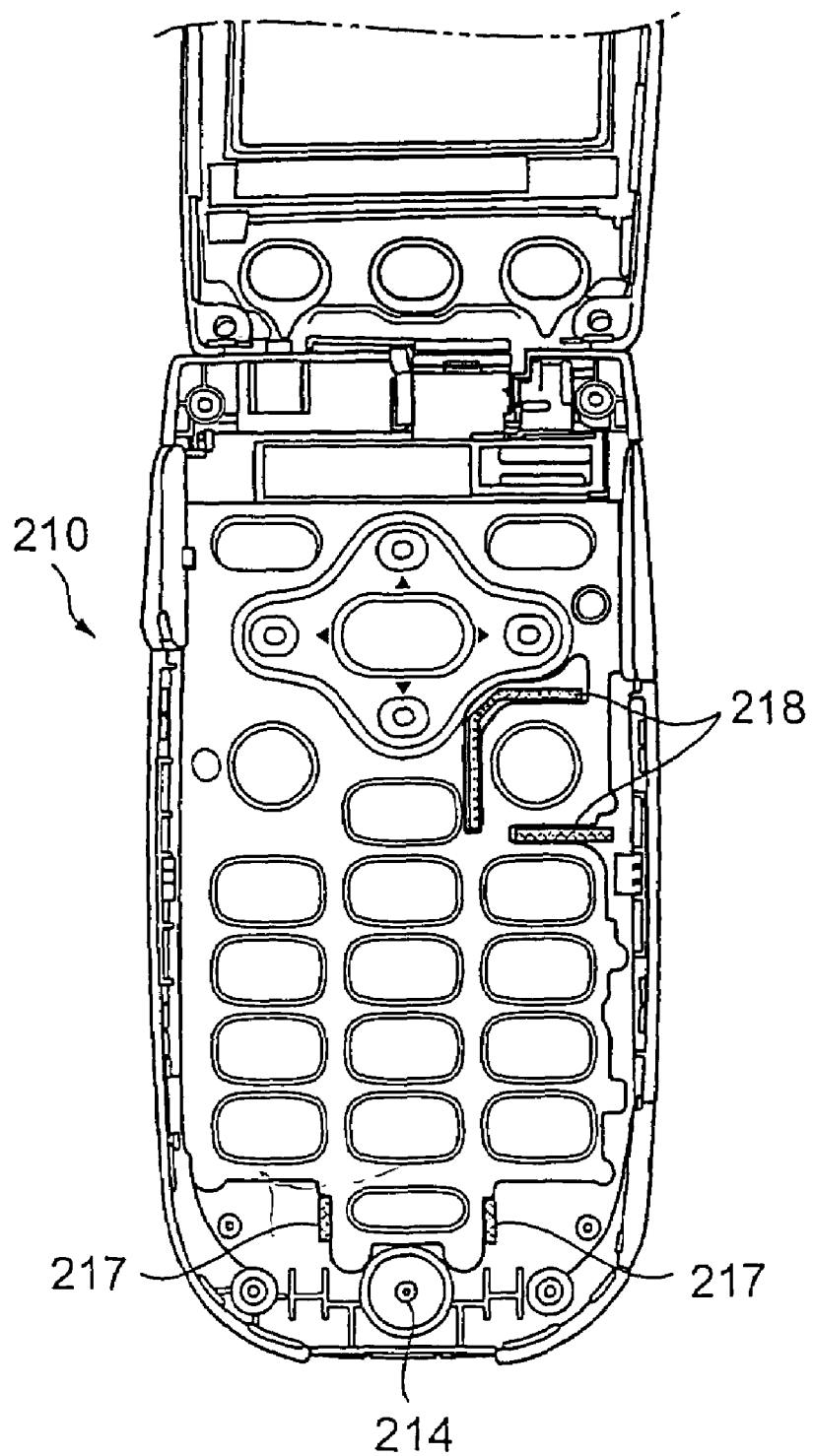
FIG. 22 is a diagram showing the inside cover in a state of placing a push button sheet on a frame.

FIG. 22 is a diagram showing the inner face of the inside cover 210 in a state of placing the push button sheet 210B on the frame 210A.

The light shielding wall 218 is provided at a position surrounding the call button 201a of the multiple push buttons 102. The light shielding wall 217 is provided at a position surrounding another call button 201b in collaboration with the light shielding member 223 provided on the assembly 220 (refer to FIG. 15).

The light shielding wall 218 is intended to prevent the push buttons other than the call button 201a from lighting up due to a leak of the light from the LED 222a as one of the multiple LEDs 222 on the assembly 220 shown in FIG. 15 when the LED 222a emits light and lights up only the call button 201a.

The light shielding wall 217 surrounds the call button 201b in collaboration with the light shielding wall 223 provided on the assembly 220 (refer to FIG. 5), and is intended to prevent light leaking to the push buttons other than the call button 201b when only the two LEDs 222b of the multiple LEDs 222 on the assembly 220 shown in FIG. 5 emit light and light up only the call button 201b.

As previously described, if the multiple LEDs 222 except the LEDs 222a and 222b on the assembly 220 emit light all together, the multiple push buttons including the two call buttons 201a and 201b lined up on the push button sheet 210B light up all together.

Figure 23:
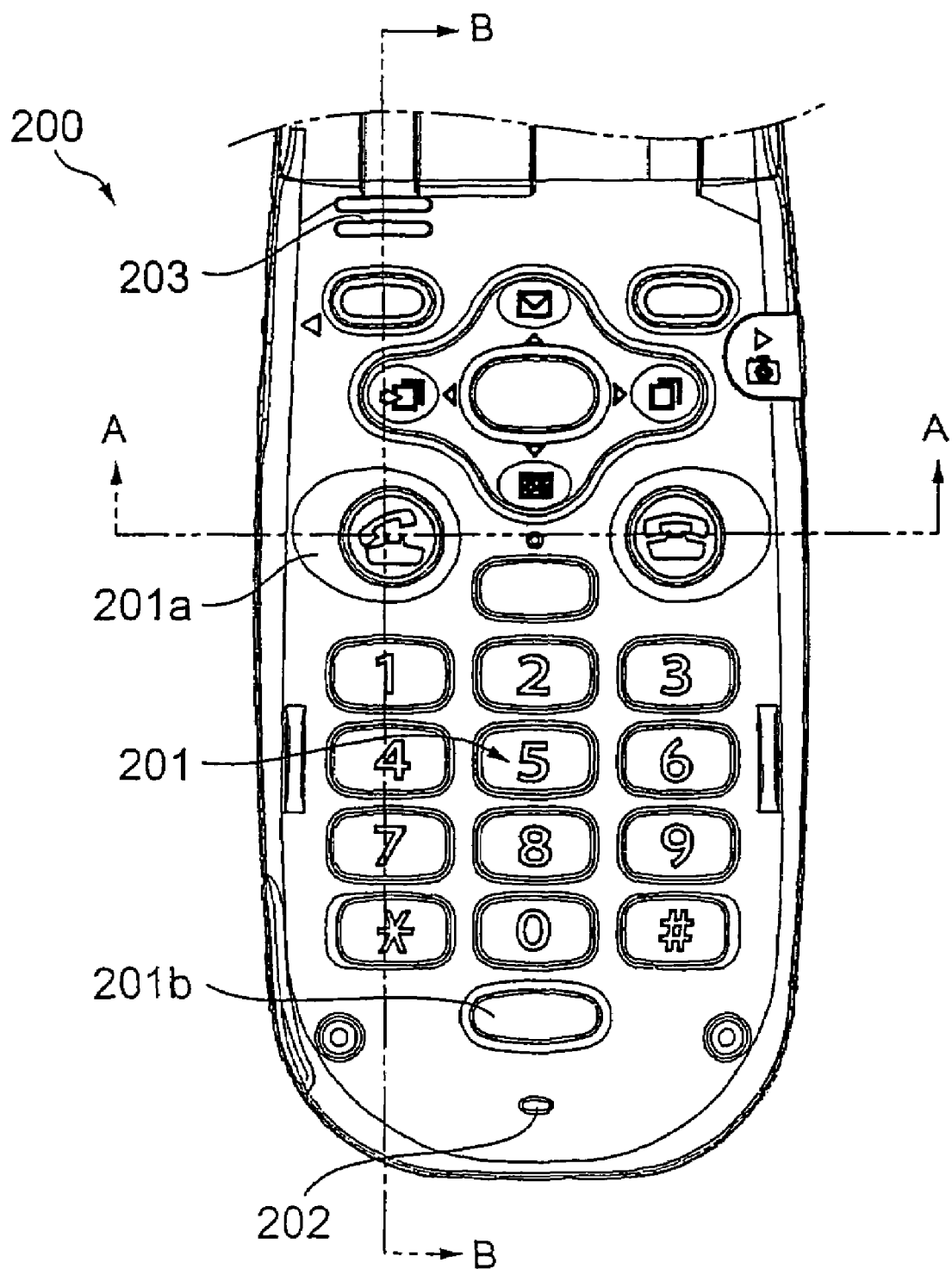
FIG. 23 is a plan view showing the downside housing.
Figure 24:
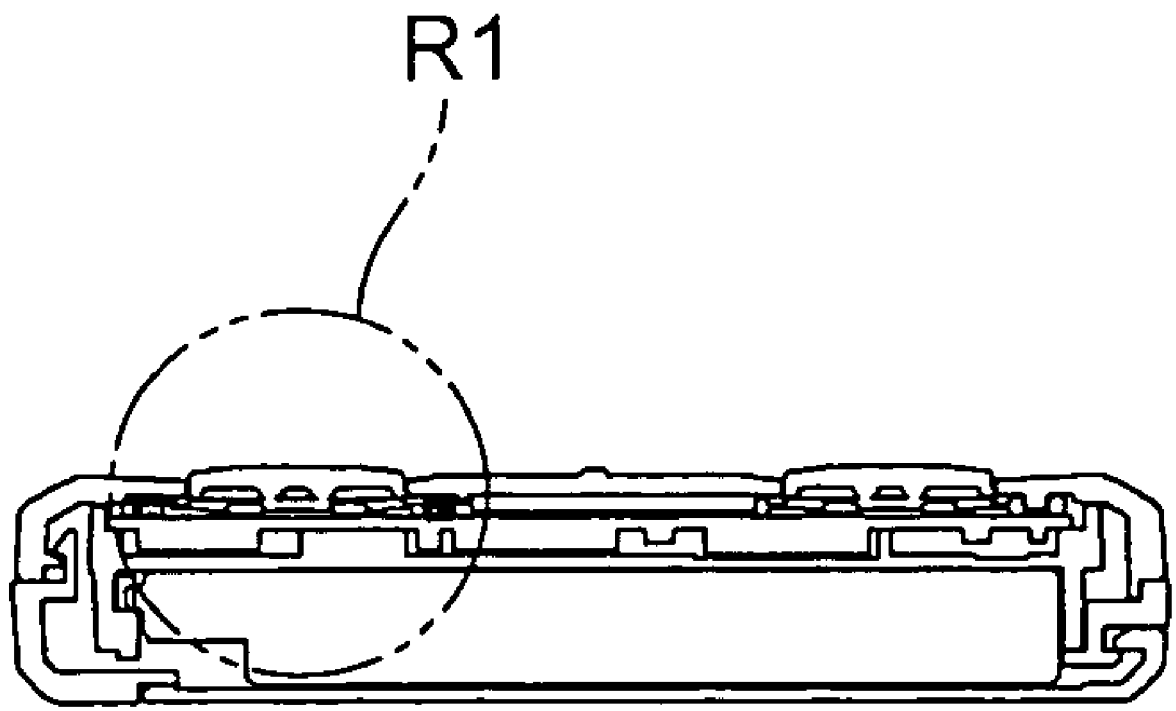
FIG. 24 is a sectional view along the arrow A to A shown in FIG. 23.
Figure 25:
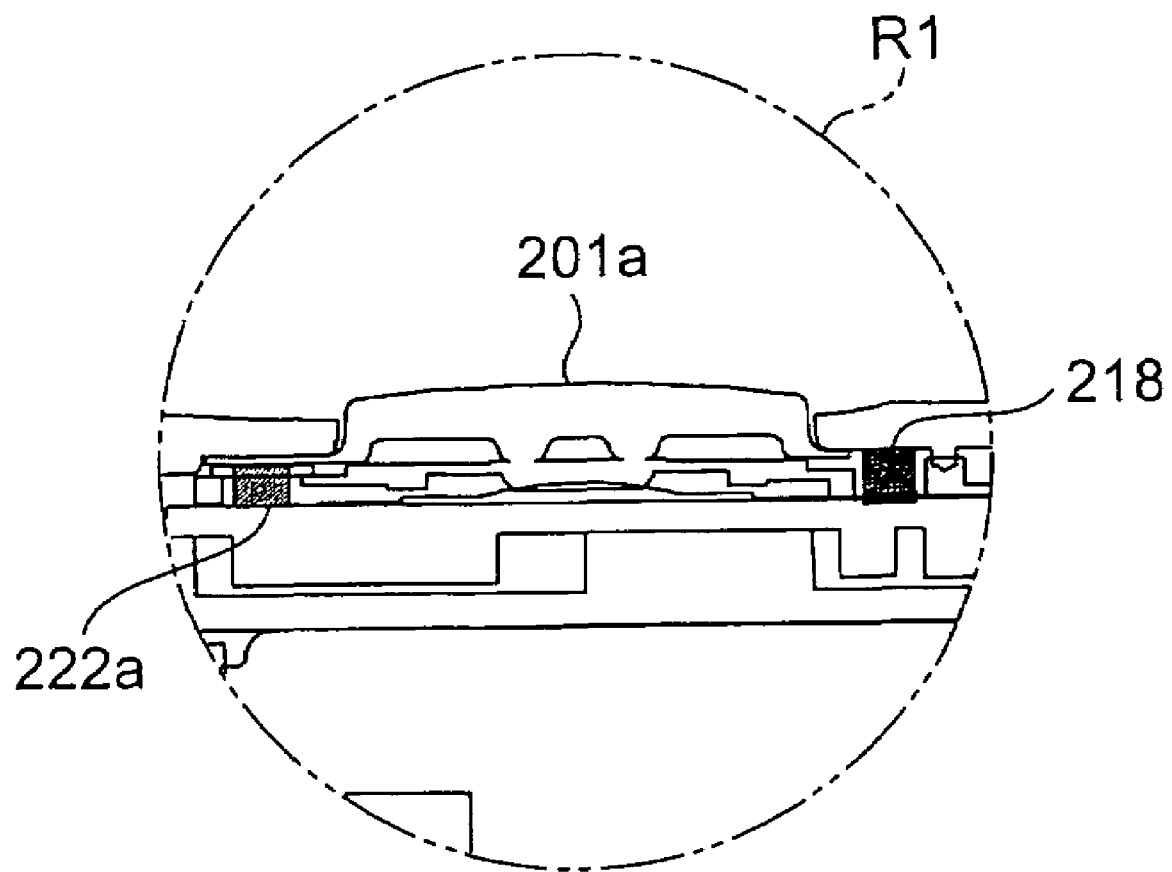
FIG. 25 is a partially enlarged view enlarging and showing the inside of a circle R1 shown in FIG. 24.
Figure 26:
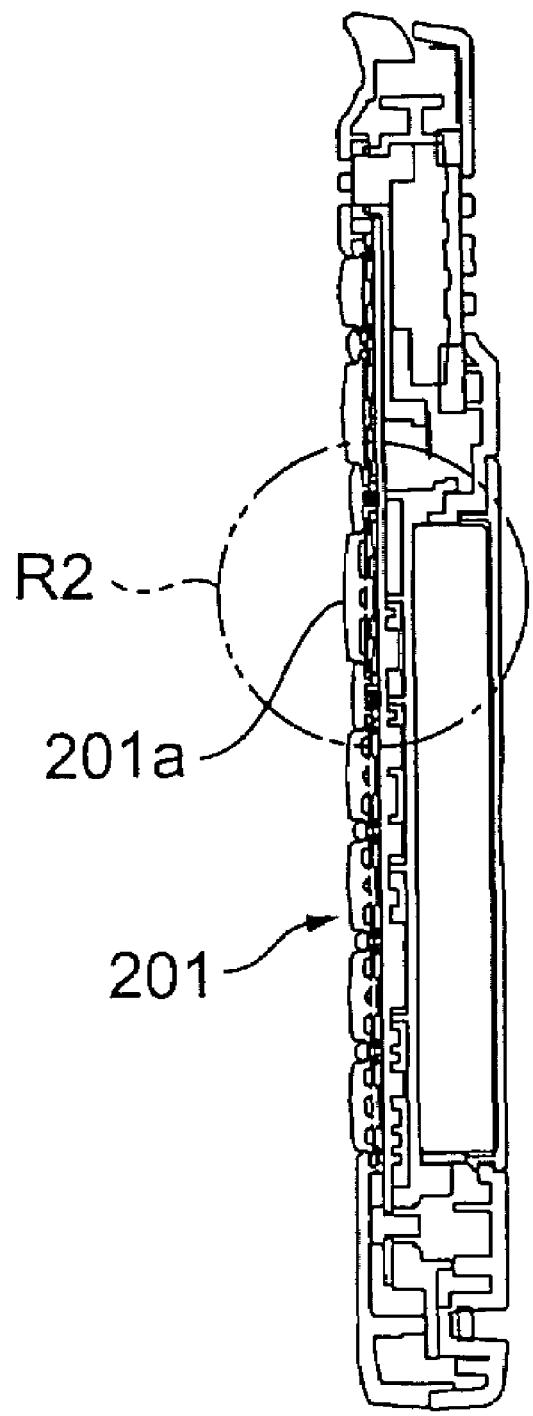
FIG. 26 is a sectional view along the arrow B to B shown in FIG. 23.
Figure 27:
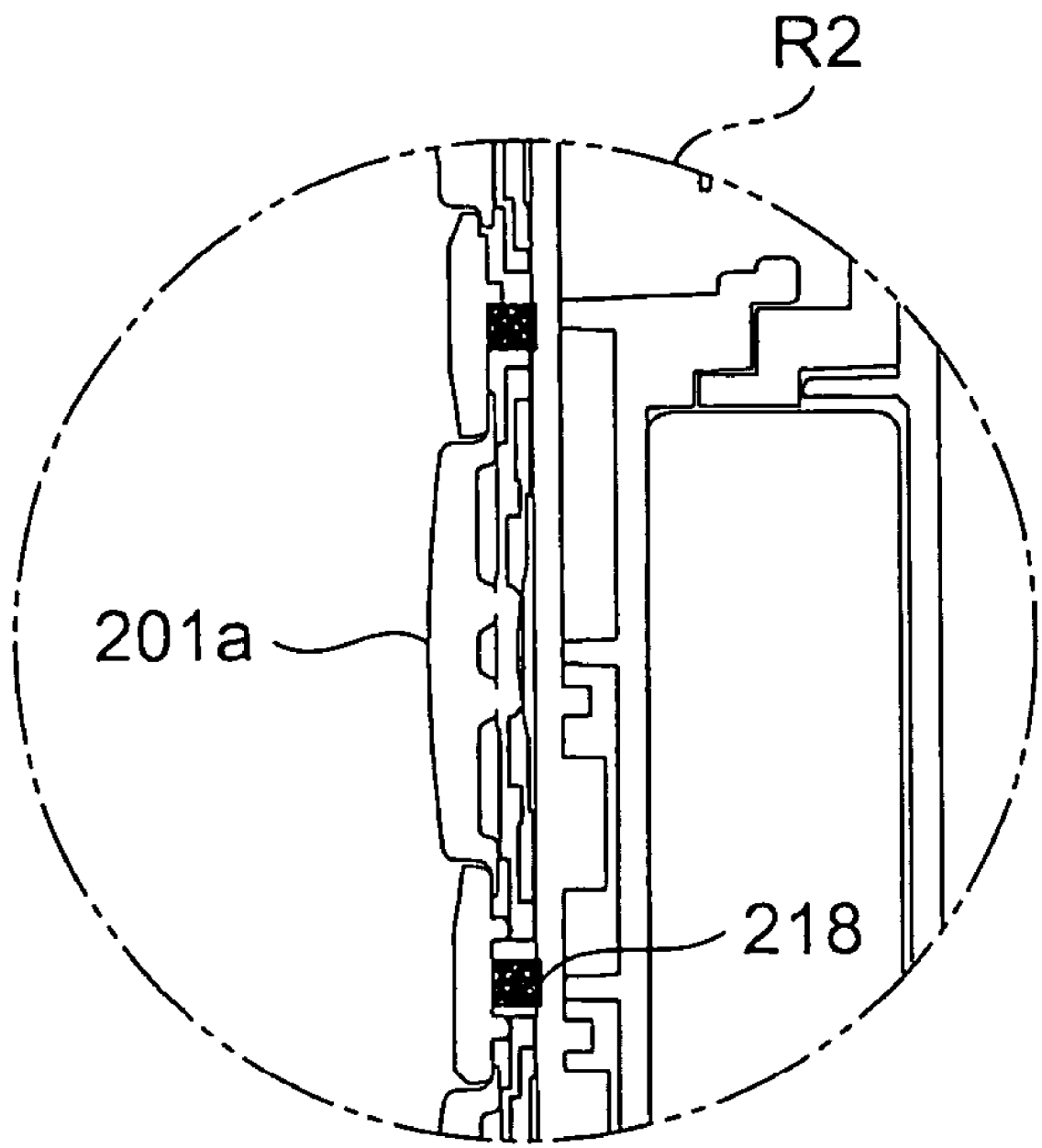
FIG. 27 is a partially enlarged view enlarging and showing the inside of a circle R2 shown in FIG. 26.

FIG. 23 is a plan view showing the downside housing. FIG. 24 is a sectional view along an arrow A to A shown in FIG. 23. FIG. 25 is a partially enlarged view enlarging and showing the inside of a circle R1 shown in FIG. 24. FIG. 26 is a sectional view along an arrow B to B shown in FIG. 23. FIG. 27 is a partially enlarged view enlarging and showing the inside of a circle R2 shown in FIG. 26.

If only the LED 222a shown in FIG. 25 emits light, the call button 201a lights up, and the light of the LED 222a is shut out by the light shielding wall 218 and is not conveyed to the other push buttons so that the push buttons other than the call button 201a remain unlit.

The call button 201a has been described here. However, it also applies to the other call button 201b.

Here, the call button 201a is the push button which lights up on receiving the ordinary call only with voice and is pushed to start the call. The other call button 201b is the push button which lights up on receiving the video-phone call and is pushed to start the video-phone call and image communication. On receiving a call, the user of this portable telephone can see whether it is the ordinary call only with voice or the video-phone call and which call button should be pushed by checking which of the two call buttons 201a and 201b is lighted up. In addition, all the push buttons light up if a folded portable telephone is opened in timing other than receiving a call so as to facilitate use in a dark place.

The portable telephone has been described above as an example of the portable terminal apparatus according to the present invention. However, any specification of communication for implementing a telephone function of the portable telephone is applicable to the present invention, such as PHS (Personal Handy Phone System).

Also, the folding type portable telephone has been described above as an example. However, the present invention is not only applicable to the folding type portable telephone but also to any form of the portable telephone.

Furthermore, the present invention is not only applicable to those in the form of the portable telephone but also to any form of the portable terminal apparatus with the telephone function, such as the portable terminal apparatus in a form similar to a PDA (Personal digital Assistance) or a wrist watch.

What is claimed is:

1. A portable terminal apparatus with a telephone function, comprising:
one speaker having a sound producing section, and a connecting section to which a lead to convey a sound signal to the sound producing section is connected;
a plate-like assembly having, on a first side, a speaker accommodating section which receives a first face of the speaker and exposes a second, opposite face of the speaker, and also has a first opening extending between the first side of the assembly to a second, opposite side of the assembly facing the first face of the speaker, with a space formed between a portion of the first side of the assembly and the first face of the speaker, and the space being in air communication with an outside of the apparatus;
a first cover having a first sound producing outlet which emits a sound from the speaker to the outside and which is located at a position opposed to the second face of the speaker;
a second, separate cover having a second sound producing outlet which emits the sound from the speaker to the outside and which is located at a position opposed to the first opening; and
a first gasket sandwiched between the first side of the assembly and the first cover, surrounding a rim of the sound producing section of the speaker and covering the connecting section so as to prevent propagation of the sound from the first sound producing outlet to the space,
wherein said speaker and said first and second sound producing outlets are arranged coaxially, and
wherein the sound is simultaneously emitted from the first and second sound producing outlets.

2. The portable terminal apparatus according to claim 1, further comprising a second gasket sandwiched between the second side of the assembly and the second cover and surrounding a rim of the first opening so as to prevent the sound from being emitted from the first opening to other than the second sound producing outlet.

3. The portable terminal apparatus according to claim 1, further comprising a pair of housings mutually supported on an axis to be pivotable and mutually openable and closable, wherein one of the housings comprises the speaker, the assembly, the first cover, the second cover and the first gasket.

4. The portable terminal apparatus according to claim 1, wherein the first sound producing outlet includes a second opening formed on the first cover and a covering which covers the second opening and allows the sound to pass therethrough.

5. The portable terminal apparatus according to claim 1, wherein the second sound producing outlet includes a third opening formed on the second cover and a covering which covers the third opening and allows the sound to pass therethrough.

6. A portable terminal apparatus with a telephone function, comprising:
a speaker having a sound producing section;
an assembly having, on a first side, a speaker accommodating section which receives a first face of the speaker and exposes a second, opposite face of the speaker, and also has a first opening extending between the first side of the assembly to a second, opposite side of the assembly facing the first face of the speaker, with a space formed between a portion of the first side of the assembly and the first face of the speaker, and the space being in air communication with an outside of the apparatus;
a first cover having a first sound producing outlet which emits a sound from the speaker to the outside and which is located at a position opposed to the second face of the speaker;
a second, separate cover having a second sound producing outlet which can simultaneously, with the first sound producing outlet, emit the sound from the speaker to the outside and which is located at a position opposed to the first opening; and
a first gasket sandwiched between the first side of the assembly and the first cover, surrounding the second face of the speaker to prevent propagation of the sound from the first sound producing outlet to the space, wherein said speaker and said first and second sound producing outlets are arranged coaxially.

7. The portable terminal apparatus according to claim 6, further comprising a second gasket sandwiched between the second side of the assembly and the second cover and surrounding the first opening so as to prevent the sound from being emitted from the first opening to other than the second sound producing outlet.

8. The portable terminal apparatus according to claim 6, further comprising a pair of housings that are movable between first and second positions, wherein one of the housings comprises the speaker, the assembly, the first cover, the second cover and the first gasket.

9. The portable terminal apparatus according to claim 6, wherein the first sound producing outlet includes a second opening and a covering which covers the second opening and allows the sound to pass therethrough.

10. The portable terminal apparatus according to claim 6, wherein the second sound producing outlet includes a third opening and a covering which covers the third opening and allows the sound to pass therethrough.

* * * * *